United States Patent
Liu et al.

(10) Patent No.: US 11,870,681 B2
(45) Date of Patent: Jan. 9, 2024

(54) BIER MULTICAST TRAFFIC STATISTICS COLLECTION METHOD, DEVICE, AND SYSTEM

(71) Applicant: Huawei Technologies Co., Ltd., Shenzhen (CN)

(72) Inventors: Shuying Liu, Beijing (CN); Jingrong Xie, Beijing (CN); Feng Zhang, Nanjing (CN); Rui Gu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/061,161

(22) Filed: Dec. 2, 2022

(65) Prior Publication Data

US 2023/0096867 A1 Mar. 30, 2023

Related U.S. Application Data

(63) Continuation of application No. PCT/CN2021/082074, filed on Mar. 22, 2021.

(30) Foreign Application Priority Data

Jun. 5, 2020 (CN) .......................... 202010511126.0
Jul. 16, 2020 (CN) .......................... 202010685228.4

(51) Int. Cl.
*G06F 15/16* (2006.01)
*H04L 45/16* (2022.01)
(Continued)

(52) U.S. Cl.
CPC .......... *H04L 45/16* (2013.01); *H04L 12/1845* (2013.01); *H04L 43/026* (2013.01); *H04L 45/34* (2013.01)

(58) Field of Classification Search
CPC ..... H04L 45/16; H04L 12/1845; H04L 45/34; H04L 43/026
See application file for complete search history.

(56) References Cited

U.S. PATENT DOCUMENTS

| | | | |
|---|---|---|---|
| 2015/0078377 A1* | 3/2015 | Wijnands ............ | H04L 12/1886 370/390 |
| 2015/0131660 A1* | 5/2015 | Shepherd ................ | H04L 45/74 370/390 |

(Continued)

FOREIGN PATENT DOCUMENTS

| | | |
|---|---|---|
| CN | 103581044 A | 2/2014 |
| CN | 105812197 A | 7/2016 |

(Continued)

OTHER PUBLICATIONS

Wijnands, IJ et al., "Multicast Using Bit Index Explicit Replication (BIER)", Request for Comments: 8279, Nov. 2017, 43 pages.

(Continued)

*Primary Examiner* — Hieu T Hoang
(74) *Attorney, Agent, or Firm* — Slater Matsil, LLP

(57) ABSTRACT

This application provides a BIER multicast traffic statistics collection method, a device, and a system. The method includes: A first network device obtains a first BIER packet. The first network device performs traffic statistics collection on the first BIER packet based on multicast flow information, to obtain a traffic statistics collection result of the first BIER packet, where the multicast flow information is used to identify a multicast flow to which the first BIER packet belongs. The first network device sends the multicast flow information and the traffic statistics collection result of the first BIER packet to a controller.

30 Claims, 8 Drawing Sheets

(51) Int. Cl.
*H04L 12/18* (2006.01)
*H04L 45/00* (2022.01)
*H04L 43/026* (2022.01)

(56) References Cited

U.S. PATENT DOCUMENTS

| | | | | |
|---|---|---|---|---|
| 2016/0254991 | A1* | 9/2016 | Eckert | H04L 12/4633 |
| | | | | 370/225 |
| 2018/0287935 | A1* | 10/2018 | Wang | H04L 12/4625 |
| 2018/0367456 | A1 | 12/2018 | Wijnands et al. | |
| 2019/0372877 | A1* | 12/2019 | Nainar | H04L 45/16 |
| 2023/0114176 | A1* | 4/2023 | Xiong | H04L 43/10 |
| | | | | 709/224 |

FOREIGN PATENT DOCUMENTS

| | | |
|---|---|---|
| CN | 106656794 A | 5/2017 |
| CN | 109257275 A | 1/2019 |
| EP | 3413514 A1 | 12/2018 |

OTHER PUBLICATIONS

Wijnands, IJ et al., "Encapsulation for Bit Index Explicit Replication (BIER) in MPLS and Non-MPLS Networks", Request for Comments: 8296, Jan. 2018, 24 pages.
Mirsky, G. et al., "Performance Measurement (PM) with Marking Method in Bit Index Explicit Replication (BIER) Layer"; draft-ietf-bier-pmmm oam-08.txt, Internet Draft, Bier Working Group, Internet Engineering Task Force, No. 8. May 26, 2020, pp. 1-9.

* cited by examiner

BIER MULTICAST TRAFFIC STATISTICS COLLECTION METHOD, DEVICE, AND SYSTEM

CROSS-REFERENCE TO RELATED APPLICATIONS

This application is a continuation of International Application No. PCT/CN2021/082074, filed on Mar. 22, 2021, which claims priority to Chinese Patent Application No. 202010511126.0, filed on Jun. 5, 2020, and Chinese Patent Application No. 202010685228.4, filed on Jul. 16, 2020. All of the aforementioned patent applications are hereby incorporated by reference in their entireties.

TECHNICAL FIELD

This application relates to the network communication field, and more specifically, to a BIER multicast traffic statistics method, a device, and a system.

BACKGROUND

An internet protocol (IP) multicast technology implements efficient point-to-multipoint data transmission in an IP network, so that network bandwidth can be effectively saved, and network load can be reduced. Therefore, a new technology for constructing a multicast data forwarding path is proposed in the industry, and is referred to as a bit index explicit replication (BIER) technology. In the technology, a multicast technology architecture in which a multicast distribution tree does not need to be constructed is provided.

The BIER technology is to perform unicast forwarding for a plurality of times on different devices in a network level by level based on a bit string in a BIER packet and bit identifiers, to implement replication to a plurality of receivers. A bit index forwarding table (BIFT) entry of a network device in a BIER domain provides forwarding guidance for any multicast flow that applies BIER forwarding, without distinguishing the multicast flow. As a result, such forwarding based on the BIER technology makes it difficult for the network device in the BIER domain to perform multicast flow statistics collection.

Therefore, how the network device in the BIER domain performs BIER multicast traffic statistics collection becomes an urgent technical problem to be resolved.

SUMMARY

This application provides a bit index explicit replication BIER multicast traffic statistics collection method, a device, and a system, to collect statistics about BIER multicast traffic.

According to a first aspect, a bit index explicit replication BIER multicast traffic statistics collection method is provided. The method includes: A first network device obtains a first BIER packet. The first network device performs traffic statistics collection on the first BIER packet based on multicast flow information, to obtain a traffic statistics collection result of the first BIER packet, where the multicast flow information is used to identify a multicast flow to which the first BIER packet belongs. The first network device sends the multicast flow information and the traffic statistics collection result of the first BIER packet to a controller.

According to the foregoing technical solution, the first network device can collect the BIER multicast traffic statistics, so as to resolve a problem that BIER multicast service traffic statistics cannot be collected. In a scenario in which BIER multicast traffic interruption or a packet loss occurs, the controller can effectively locate a lost or interrupted data packet based on the multicast traffic statistics.

In a possible implementation, the first network device is an ingress device in a BIER domain. Before the first network device obtains the first BIER packet, the method further includes: The first network device performs BIER encapsulation on first multicast data based on a traffic statistics collection instruction, to obtain the first BIER packet, where the traffic statistics collection instruction includes a multicast source group (S, G) of the first multicast data, and the traffic statistics collection instruction is used to instruct to perform traffic statistics collection on the first multicast data that includes the multicast source group (S, G).

It should be understood that the traffic statistics collection instruction may be sent by the controller to the first network device, or may be directly configured on the first network device based on a command line.

In another possible implementation, the method further includes: The first network device generates a first correspondence, where the first correspondence is a correspondence between the multicast source group (S, G) of the first multicast data and the multicast flow information; and the first network device sends the first correspondence to the controller.

According to the foregoing technical solution, the controller may map the first BIER packet to the multicast source group (S, G) of the first multicast data based on the first correspondence and the multicast flow information and the traffic statistics collection result of the first BIER packet, where the multicast flow information and the traffic statistics collection result of the first BIER packet are sent by the first network device; and the controller may perform traffic statistics collection on the multicast source group (S, G) of the first multicast data based on the traffic statistics collection result.

In another possible implementation, the first network device is an intermediate forwarding device or an egress device in a BIER domain. Before the first network device performs traffic statistics collection on the first BIER packet, the method further includes: The first network device determines to perform traffic statistics collection on the first BIER packet.

In another possible implementation, the first network device receives first indication information sent by the controller, the first indication information includes the multicast flow information, and the first indication information indicates to perform traffic statistics collection on the first BIER packet. The first network device determines to perform traffic statistics collection on the first BIER packet based on the first indication information.

According to the foregoing technical solution, the first network device may directly perform traffic statistics collection on the first BIER packet based on the first indication information sent by the controller.

In another possible implementation, the multicast flow information includes any one of the following: a bit forwarding ingress router identifier BFIR-ID and an entropy label in a BIER header of the first BIER packet; a source address SA and a flow label in an outer internet protocol version 6 IPv6 header of the first BIER packet; the multicast source group (S, G) of the first multicast data in an inner layer of the first BIER packet; or a virtual private network multicast source group (VPN, S, G) of the first multicast data in an inner layer of the first BIER packet.

In another possible implementation, the first BIER packet carries a traffic statistics collection identifier, and the traffic statistics collection identifier indicates to perform traffic statistics collection on the first BIER packet. The first network device determines to perform traffic statistics collection on the first BIER packet based on the traffic statistics collection identifier.

According to the foregoing technical solution, the controller does not need to deliver the indication information to the intermediate forwarding device or the egress device in the BIER domain, and the intermediate forwarding device or the egress device in the BIER domain may determine, depending on whether the first BIER packet carries the traffic statistics collection identifier, whether to perform traffic statistics collection on the first BIER packet. In this way, configuration complexity can be reduced.

In another possible implementation, the traffic statistics collection identifier is carried in a first field of the first BIER packet.

In another possible implementation, the first field is an operations, administration, and maintenance OAM field, a reserved Rsv field, or a field in a BIER extension header.

In another possible implementation, the first BIER packet further includes a second field, and the second field indicates that the first field carries the traffic statistics collection identifier. The method further includes: The first network device obtains the traffic statistics collection identifier in the first field based on the second field.

In another possible implementation, the method further includes: The first network device obtains interface information of the first BIER packet. The first network device sends the interface information of the first BIER packet to the controller.

According to the foregoing technical solution, the controller may further restore a service path based on the interface information of the first BIER packet, and restore a traffic statistics collection result of the multicast source group (S, G) of the first multicast data corresponding to the first BIER packet to the service path. The controller may determine based on traffic analysis of a multicast flow on the service path, whether a packet loss or traffic interruption occurs in the multicast flow. If such a fault occurs, the controller may assist a user in demarcating and locating a fault point. For example, an alarm may be generated and an upstream device may be compared with a downstream device, to assist the user in demarcating and locating the fault point.

According to a second aspect, a bit index explicit replication BIER multicast traffic statistics collection method is provided. The method includes: A controller receives multicast flow information and a traffic statistics collection result of a first BIER packet that are sent by a first network device in a BIER domain, where the multicast flow information is used to identify a multicast flow to which the first BIER packet belongs. The controller performs traffic analysis on the first BIER packet based on the multicast flow information and the traffic statistics collection result of the first BIER packet.

In a possible implementation, the first network device is an ingress device in the BIER domain. Before the controller receives the multicast flow information and the traffic statistics collection result of the first BIER packet that are sent by the first network device, the method further includes: The controller sends a traffic statistics collection instruction to the first network device. The traffic statistics collection instruction includes a multicast source group (S, G) of first multicast data, and the traffic statistics collection instruction is used to instruct the first network device to perform traffic statistics collection on the first BIER packet that includes the multicast source group (S, G).

In another possible implementation, before the controller receives the multicast flow information and the traffic statistics collection result of the first BIER packet that are sent by the first network device, the method further includes: The controller receives a first correspondence sent by the first network device, where the first correspondence is a correspondence between the multicast source group (S, G) of the first multicast data and the multicast flow information.

In another possible implementation, the multicast flow information includes any one of the following: a bit forwarding ingress router identifier BFIR-ID and an entropy label in a BIER header of the first BIER packet; a source address SA and a flow label in an outer internet protocol version 6 IPv6 header of the first BIER packet; the multicast source group (S, G) of the first multicast data in an inner layer of the first BIER packet; or a virtual private network multicast source group (VPN, S, G) of the first multicast data in an inner layer of the first BIER packet.

In another possible implementation, the first network device is an intermediate forwarding device or an egress device in the BIER domain. The method further includes: The controller sends first indication information to the first network device, the first indication information includes the multicast flow information, and the first indication information indicates the first network device to perform traffic statistics collection on the first BIER packet.

In another possible implementation, the method further includes: The controller receives interface information of the first BIER packet sent by the first network device. The controller determines a transmission path of the first BIER packet based on the interface information of the first BIER packet and physical topology information.

Advantageous effects of any one of the second aspect or the possible implementations of the second aspect correspond to advantageous effects of any one of the first aspect or the possible implementations of the first aspect. Details are not described herein again.

According to a third aspect, a first network device is provided. The first network device includes: a processing module, configured to obtain a first BIER packet, where the processing module is further configured to perform traffic statistics collection on the first BIER packet based on multicast flow information, to obtain a traffic statistics collection result of the first BIER packet, where the multicast flow information is used to identify a multicast flow to which the first BIER packet belongs; and a sending module, configured to send the multicast flow information and the traffic statistics collection result of the first BIER packet to a controller.

In a possible implementation, the first network device is an ingress device in a BIER domain.

The processing module is further configured to perform BIER encapsulation on first multicast data based on a traffic statistics collection instruction, to obtain the first BIER packet, where the traffic statistics collection instruction includes a multicast source group (S, G) of the first multicast data, and the traffic statistics collection instruction is used to instruct to perform traffic statistics collection on the first multicast data that includes the multicast source group (S, G).

In another possible implementation, the first network device further includes: the processing module, further configured to generate a first correspondence, where the first correspondence is a correspondence between the multicast source group (S, G) of the first multicast data and the multicast flow information; and the sending module, further configured to send the first correspondence to the controller.

In another possible implementation, the first network device is an intermediate forwarding device or an egress device in a BIER domain. The processing module is further configured to determine to perform traffic statistics collection on the first BIER packet.

In another possible implementation, the first network device further includes: a receiving module, configured to receive first indication information sent by the controller, where the first indication information includes the multicast flow information, and the first indication information indicates to perform traffic statistics collection on the first BIER packet; and the processing module, specifically configured to determine to perform traffic statistics collection on the first BIER packet based on the first indication information.

In another possible implementation, the multicast flow information includes any one of the following: a bit forwarding ingress router identifier BFIR-ID and an entropy label in a BIER header of the first BIER packet; a source address SA and a flow label in an outer internet protocol version 6 IPv6 header of the first BIER packet; the multicast source group (S, G) of the first multicast data in an inner layer of the first BIER packet; or a virtual private network multicast source group (VPN, S, G) of the first multicast data in an inner layer of the first BIER packet.

In another possible implementation, the first BIER packet carries a traffic statistics collection identifier, and the traffic statistics collection identifier indicates to perform traffic statistics collection on the first BIER packet. The processing module is specifically configured to determine to perform traffic statistics collection on the first BIER packet based on the traffic statistics collection identifier.

In another possible implementation, the traffic statistics collection identifier is carried in a first field of the first BIER packet.

In another possible implementation, the first field is an operations, administration, and maintenance OAM field, a reserved Rsv field, or a field in a BIER extension header.

In another possible implementation, the first BIER packet further includes a second field, and the second field indicates that the first field carries the traffic statistics collection identifier. The processing module is further configured to obtain the traffic statistics collection identifier in the first field based on the second field.

In another possible implementation, the processing module is further configured to obtain interface information of the first BIER packet. The sending module is further configured to send the interface information of the first BIER packet to the controller.

According to a fourth aspect, a controller is provided, including: a receiving module, configured to receive multicast flow information and a traffic statistics collection result of a first BIER packet that are sent by a first network device in a BIER domain, where the multicast flow information is used to identify a multicast flow to which the first BIER packet belongs; and a processing module, configured to perform traffic analysis on the first BIER packet based on the multicast flow information and the traffic statistics collection result of the first BIER packet.

In a possible implementation, the first network device is an ingress device in the BIER domain. The controller further includes a sending module, configured to send a traffic statistics collection instruction to the first network device. The traffic statistics collection instruction includes a multicast source group (S, G) of first multicast data, and the traffic statistics collection instruction is used to instruct the first network device to perform traffic statistics collection on the first BIER packet that includes the multicast source group (S, G).

In another possible implementation, the receiving module is further configured to receive a first correspondence sent by the first network device, where the first correspondence is a correspondence between the multicast source group (S, G) of the first multicast data and the multicast flow information.

In another possible implementation, the multicast flow information includes any one of the following: a bit forwarding ingress router identifier BFIR-ID and an entropy label in a BIER header of the first BIER packet; a source address SA and a flow label in an outer internet protocol version 6 IPv6 header of the first BIER packet; the multicast source group (S, G) of the first multicast data in an inner layer of the first BIER packet; or a virtual private network multicast source group (VPN, S, G) of the first multicast data in an inner layer of the first BIER packet.

In another possible implementation, the first network device is an intermediate forwarding device or an egress device in a BIER domain. The controller further includes a sending module, configured to send first indication information to the first network device, the first indication information includes the multicast flow information, and the first indication information indicates the first network device to perform traffic statistics collection on the first BIER packet.

In another possible implementation, the receiving module is further configured to receive interface information of the first BIER packet sent by the first network device; and the processing module is further configured to determine a transmission path of the first BIER packet based on the interface information of the first BIER packet and physical topology information.

According to a fifth aspect, a first network device is provided. The first network device has a function of implementing behavior of the first network device in the foregoing methods. The function may be implemented based on hardware, or may be implemented based on hardware executing corresponding software. The hardware or the software includes one or more modules corresponding to the foregoing function.

In a possible design, a structure of the first network device includes a processor and an interface, and the processor is configured to support the first network device to perform a corresponding function in the foregoing method. The interface is configured to support the first network device in receiving the first BIER packet, or configured to support the first network device in sending the multicast flow information and the traffic statistics collection result of the first BIER packet to a controller.

The first network device may further include a memory. The memory is configured to be coupled to the processor, and store program instructions and data that are required for the first network device.

In another possible design, the first network device includes a processor, a transmitter, a receiver, a random access memory, a read-only memory, and a bus. The processor is coupled to the transmitter, the receiver, the random access memory, and the read-only memory through the bus. When the first network device needs to be run, a bootloader in a basic input/output system built into the ROM or in an embedded system in the read-only memory is used to boot a system to start, and boot the first network device to enter a normal running state. After entering the normal running state, the first network device runs an application program and an operating system in the random access memory, so that the processor performs the method in the first aspect or any possible implementations of the first aspect.

According to a sixth aspect, a first network device is provided. The first network device includes a main control board and an interface board, and may further include a switching board. The first network device is configured to perform the method in the first aspect or any possible implementations of the first aspect. Specifically, the first network device includes modules configured to perform the method in the first aspect or any possible implementations of the first aspect.

According to a seventh aspect, a first network device is provided. The first network device includes a control module and a first forwarding subdevice. The first forwarding subdevice includes an interface board, and may further include a switching board. The first forwarding subdevice is configured to perform a function of the interface board in the sixth aspect, and may further perform a function of the switching board in the sixth aspect. The control module includes a receiver, a processor, a transmitter, a random access memory, a read-only memory, and a bus. The processor is coupled to the receiver, the transmitter, the random access memory, and the read-only memory through the bus. When the control module needs to be run, a bootloader in a basic input/output system built into the read-only memory or in an embedded system in the read-only memory is used to boot a system to start, and boot the control module to enter a normal running state. After entering the normal running state, the control module runs an application program and an operating system in the random access memory, so that the processor performs a function of the main control board in the sixth aspect.

It may be understood that the first network device may include any quantity of interfaces, processors, or memories in actual application.

According to an eighth aspect, a controller is provided. The controller has a function of implementing behavior of the controller in the foregoing method. The function may be implemented based on hardware, or may be implemented based on hardware executing corresponding software. The hardware or the software includes one or more modules corresponding to the foregoing function.

In a possible design, a structure of the controller includes a processor and an interface, and the processor is configured to support the controller to perform a corresponding function in the foregoing method. The interface is configured to: support the controller in receiving multicast flow information and a traffic statistics collection result of a first BIER packet that are sent by a first network device in a BIER domain, support the controller in delivering a traffic statistics collection instruction to the first network device, or support the controller in receiving a first correspondence sent by the first network device.

The controller may further include a memory. The memory is configured to be coupled to the processor, and store program instructions and data that are required for the controller.

In another possible design, the controller includes a processor, a transmitter, a receiver, a random access memory, a read-only memory, and a bus. The processor is coupled to the transmitter, the receiver, the random access memory, and the read-only memory through the bus. When the controller needs to be run, a bootloader in a basic input/output system built into the read-only memory or in an embedded system in the read-only memory is used to boot a system to start, and boot the controller to enter a normal running state. After entering the normal running state, the controller runs an application program and an operating system in the random access memory, so that the processor performs the method in the second aspect or any possible implementations of the second aspect.

It may be understood that the controller may include any quantity of interfaces, processors, or memories in actual application.

According to a ninth aspect, a computer program product is provided. The computer program product includes computer program code. When the computer program code is run on a computer, the computer is enabled to perform the method according to the first aspect or any one of the possible implementations of the first aspect.

According to a tenth aspect, a computer program product is provided. The computer program product includes computer program code. When the computer program code is run on a computer, the computer is enabled to perform the method according to the second aspect or any one of the possible implementations of the second aspect.

According to an eleventh aspect, a computer-readable medium is provided. The computer-readable medium stores program code. When the computer program code is run on a computer, the computer is enabled to perform the method according to the first aspect or any one of the possible implementations of the first aspect. The computer-readable storage includes but is not limited to one or more of the following: a read-only memory (ROM), a programmable ROM (PROM), an erasable PROM (erasable PROM, EPROM), a Flash memory, electrically EPROM (EEPROM), and hard drive.

According to a twelfth aspect, a computer-readable medium is provided. The computer-readable medium stores program code. When the computer program code is run on a computer, the computer is enabled to perform the method according to the second aspect or any one of the possible implementations of the second aspect. The computer-readable storage includes but is not limited to one or more of the following: a read-only memory (ROM), a programmable ROM (PROM), an erasable PROM (EPROM), a Flash memory, electrically EPROM (EEPROM), and hard drive.

According to a thirteenth aspect, a chip is provided. The chip includes a processor and a data interface. The processor reads, by using the data interface, instructions stored in a memory, to perform the method in the first aspect or any one of the possible implementations of the first aspect. In a specific implementation process, the chip may be implemented in a form of a central processing unit (CPU), a micro controller unit (MCU), a micro processing unit (MPU), a digital signal processor (DSP), a system-on-a-chip (SoC), an application-specific integrated circuit (ASIC), a field programmable gate array (FPGA), or a programmable logic device (PLD).

According to a fourteenth aspect, a chip is provided. The chip includes a processor and a data interface. The processor reads, by using the data interface, instructions stored in a memory, to perform the method in the second aspect or any one of the possible implementations of the second aspect. In a specific implementation process, the chip may be implemented in a form of a central processing unit (CPU), a micro controller unit (MCU), a micro processing unit (MPU), a digital signal processor (DSP), a system-on-a-chip (SoC), an application-specific integrated circuit (ASIC), a field programmable gate array (FPGA), or a programmable logic device (PLD).

According to a fifteenth aspect, a system is provided. The system includes the foregoing first network device and controller.

DETAILED DESCRIPTION OF ILLUSTRATIVE EMBODIMENTS

Figure 1:
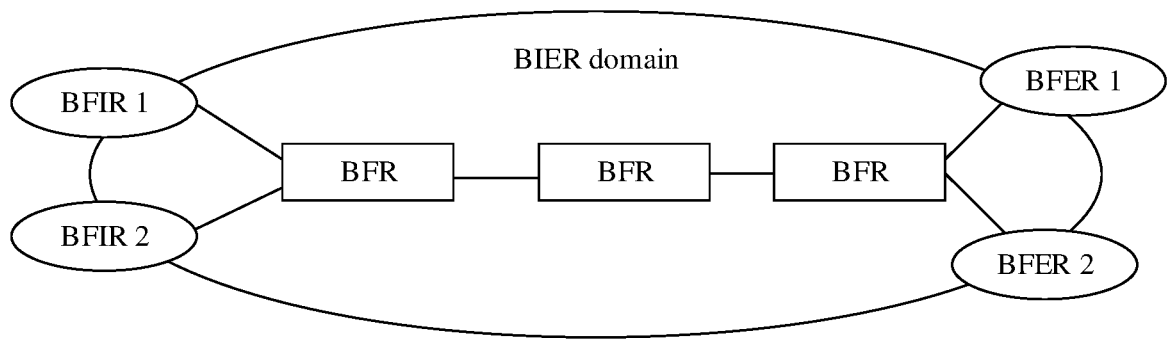
FIG. 1 is a schematic networking diagram of a BIER technology according to an embodiment of this application.

The following describes technical solutions of this application with reference to the accompanying drawings.

All aspects, embodiments, or features are presented in this application by describing a system that may include a plurality of devices, components, modules, or the like. It should be appreciated and understood that, each system may include another device, component, module, and the like, and/or may not include all devices, components, modules, and the like discussed with reference to the accompanying drawings. In addition, a combination of these solutions may be used.

In addition, in embodiments of this application, terms such as "for example" and "such as" are used to represent giving an example, an illustration, or description. Any embodiment or design solution described as an "example" in this application should not be explained as being more preferred or having more advantages than another embodiment or design solution. Exactly, the word "example" is used to present a concept in a specific manner.

In embodiments of this application, "corresponding (corresponding or relevant)" and "corresponding" may be interchangeably used sometimes. It should be noted that meanings expressed by the terms are consistent when differences are not emphasized.

A network architecture and a service scenario described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and the emergence of new service scenarios, the technical solutions provided in embodiments of this application are also applicable to similar technical problems.

Reference to "an embodiment", "some embodiments", or the like described in this specification indicates that one or more embodiments of this application include a specific feature, structure, or characteristic described with reference to embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner.

In this application, at least one means one or more, and a plurality of means two or more. The term "and/or" describes an association relationship for describing associated objects and represents that three relationships may exist. For example, A and/or B may indicate a case in which only A exists, both A and B exist, and only B exists, where A and B may be singular or plural. The character "/" generally indicates an "or" relationship between the associated objects. At least one of the following items (pieces) or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural.

Multicast is a data transmission mode in which data is efficiently sent to a plurality of receivers in a transmission control protocol (TCP)/internet protocol (IP) network at a same time by using one multicast address. A multicast source sends a multicast flow to multicast group members in a multicast group through a link in a network, and each multicast group member in the multicast group can receive the multicast flow. In a multicast transmission mode, a point-to-multipoint data connection is implemented between the multicast source and the multicast group members. The multicast flow needs to be transmitted only once on each network link, and multicast replication is performed only when there is a branch on the link. Therefore, based on the multicast transmission mode, data transmission efficiency is improved and a possibility of congestion on a backbone network is reduced.

An internet protocol (IP) multicast technology implements efficient point-to-multipoint data transmission in an IP network, so that network bandwidth can be effectively saved, and network load can be reduced. Therefore, the internet protocol multicast technology is widely used in many aspects, such as real-time data transmission, multimedia conferencing, data copy, an internet protocol television (IPTV), games, and simulation. In the multicast technology, a multicast tree is constructed on a control plane by using a multicast protocol, and then logic on a network plane is made to be tree-shaped by using the multicast tree, to implement multicast point-to-multipoint data forwarding. Each intermediate device using construction of a distribution tree as a core needs to maintain complex multicast forwarding information status. As a network scale is increasingly large and multicast data traffic increases over time, this multicast technology faces an increasingly large challenge in terms of costs and operation and maintenance.

Therefore, a new technology for constructing a multicast data forwarding path is proposed in the industry, and is referred to as a bit index explicit replication (BIER) technology. In the technology, a multicast technology architecture in which a multicast distribution tree does not need to be constructed is provided. As shown in FIG. 1, a router supporting the BIER technology is referred to as a bit-forwarding router (BFR), and the BFR can receive and forward a BIER packet. A multicast forwarding domain including one or more BFRs is referred to as a BIER domain. At an ingress in the BIER domain, a BFR that performs BIER encapsulation on an original multicast data packet is referred to as a bit forwarding ingress router (BFIR). At an egress in the BIER domain, a BFR that decapsulates the original multicast data packet from the BIER packet is referred to as a bit forwarding egress router (BFER). It should be understood that the BFIR and the BFER in the BIER domain may be referred to as edge BFRs in the BIER domain.

For ease of understanding, a BIER-related technology is first described below in detail with reference to FIG. 2 to FIG. 5.

In the BIER domain, a globally unique bit position identifier in an entire BIER sub-domain (SD) may be configured for the edge BFR. In an example, a value is configured for each edge BFR as a BFR identifier (BFR ID). For example, the BFR ID may be a value ranging from 1 to 256. All BFR IDs in the BIER domain form a bit string.

In embodiments of this application, when the original multicast data packet is transmitted in the BIER domain, a specific BIER header needs to be additionally encapsulated. The BIER header uses a bit string to identify all destination devices of the original multicast data packet. BFRs in the BIER domain may perform forwarding based on a bit index forwarding table (bit index forwarding table, BIFT) and the bit string carried in the BIER header, to ensure that the original multicast data packet can be sent to all destination addresses.

It should be noted that the destination device of the original multicast data packet in this application may be a set of a plurality of BFERs. For ease of description, a set of a plurality of BFERs to which the original multicast data packet needs to be sent is referred to as a destination device below.

It should be understood that the original multicast data packet after the BIER header may be an internet protocol version 6 (IPv6) multicast packet, or may be an internet protocol version 4 (IPv4) multicast packet. This is not specifically limited in this application.

There may be various types of BIER encapsulation. This is not specifically limited in this application. In an example, a BIER packet may be encapsulated through multi-protocol label switching (MPLS), and this type of encapsulation may be referred to as BIER-MPLS encapsulation. In another example, a BIER packet may be encapsulated based on the internet protocol version 6 (IPv6), and this type of encapsulation may be referred to as BIERv6 encapsulation.

A technology related to BIER-MPLS encapsulation is described below in detail with reference to FIG. 2 to FIG. 4.

A BIER header format is not specifically limited in embodiments of this application, provided that the BIER header includes a bit string field. Two possible BIER header formats are respectively described below in detail with reference to FIG. 2 and FIG. 3.

Figure 2:
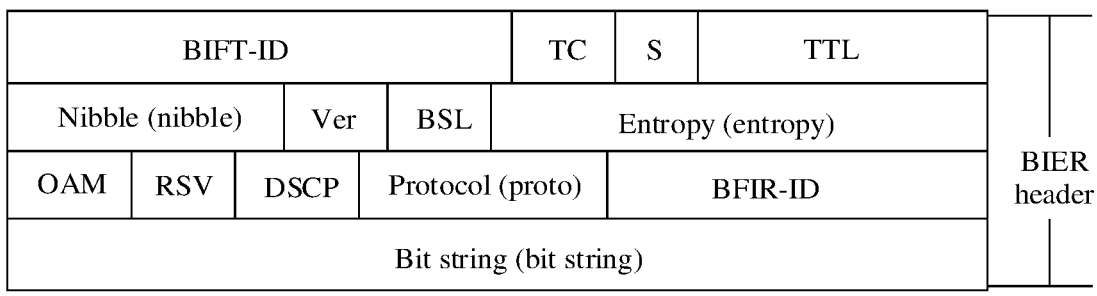
FIG. 2 is a schematic diagram of a possible BIER header format according to an embodiment of this application.

FIG. 2 is a schematic block diagram of a possible BIER header format. As shown in FIG. 2, a BIER header may include but is not limited to: a bit index forwarding table identifier (BIFT ID) having a length of 20 bits, a bit string length (BSL), and other fields of 64 bits (8 bytes), for example, a traffic class (TC) of an original multicast data packet after the BIER header, a stack (S), a time to live (TTL) field, an entropy field, a version (Ver) field, a nibble field, a protocol (proto) field, an operations, administration, and maintenance (OAM) field, a reserved (Rsv) field, and a differentiated services code point (DSCP) field.

The fields in the BIER header are separately described below in detail.

(1) BIFT ID Field

The BIFT ID field has a length of 20 bits, and is an MPLS label (L) in BIER-multi-protocol label switching (MPLS) encapsulation. The MPLS label may be referred to as a BIER label. Fields such as the TC/S/TTL field following the BIER label have a standard label coding format. The fields such as the TC/S/TTL field are separately described below, and details are not described herein.

A BIFT ID may be a BIFT-id, and may include a combination of a sub-domain (SD)/a bit string length (BSL)/a set identifier (SI). Different BIFT IDs may correspond to different combinations of SDs/BSLs/SIs.

It should be understood that different BIFT IDs may be mapped to different combinations of SDs/BSLs/SIs. The BIER header format shown in FIG. 2 does not directly include an SD/BSL/SI field, the SD field, the BSL field, and the SI field are three implicit fields, and an SD/BSL/SI value needs to be obtained through mapping based on the BIFT ID field.

1. Sub-Domain (SD)

One BIER domain may be divided and configured into different sub-domains SDs based on a requirement of an actual service scenario, to support a multi-topology feature and the like of an interior gateway protocol (IGP). Each BIER domain needs to include at least one sub-domain, that is, a default sub-domain 0. When a plurality of sub-domains are obtained through division, all the sub-domains need to be configured for each BFR router in the BIER domain. For example, the sub-domain 0 may be configured on each BFR router in the BIER domain and default topology in a system is used; and a sub-domain 1 may be further configured on the BFR router and a multicast topology is used.

Each sub-domain SD is represented by a sub-domain identifier (SD-ID). For example, a value of the SD-ID is [0-255], and a length of the SD-ID is 8 bits. In an example, the BIER domain may be configured into different SDs based on different virtual private networks (VPNs), and different VPNs are configured to use different SDs. For example, a VPN 1 uses an SD 0, and a VPN 2 uses an SD 1.

It should be noted that a plurality of VPNs may alternatively use a same SD. Different SDs in the BIER domain may be in one interior gateway protocol (IGP) process or topology, or may not be in one IGP process or topology. This is not specifically limited in embodiments of this application.

2. Bit String Length (BSL)

The BSL is a length of a bit string included in the BIER header. There may be various types of BSLs. This is not specifically limited in embodiments of this application. A smallest BSL is 64 bits, the BSL may alternatively be 128 bits, 256 bits, 512 bits, 1024 bits, or 2048 bits, and a largest BSL is 4096 bits. Specifically, the BSL is identified in a packet by 4 bits. For example, when the BSL is 64 bits, the BSL is identified in a packet by 0001; when the BSL is 128 bits, the BSL is identified in the packet by 0010; when the BSL is 512 bits, the BSL is identified in the packet by 0100; when the BSL is 1024 bits, the BSL is identified in the packet by 0101; and so on.

3. Set Identifier (SI)

If a quantity of BFER devices in a network is greater than 256, to adapt to this case, BIER encapsulation includes not only a bit string, but also a set identifier (SI). The SI is used to divide numbers of BIER devices into a plurality of different intervals, to support larger-scale network addressing.

The SI may be understood as a set including a plurality of edge BFRs in a network or including configured BFR IDs. In an example, the BSL is 256 bits, but there are more than 256 edge BFRs in a network, or there are more than 256 configured BFR IDs. In this case, these edge BFRs or BFR IDs need to be divided into different sets. For example, 256 edge BFRs whose BFR IDs range from 1 to 256 are a set 0 (a set index 0, or SI=0), and 256 edge BFRs whose BFR IDs range from 257 to 512 are a set 1 (a set index 1, or SI=1).

After receiving a BIER packet, a BFR in the BIER domain may determine, based on a BIFT ID in a BIER header, a specific SD to which the BIER packet belongs, a used BSL, and a set of a specific SI and a BSL of the packet.

Corresponding combinations of SDs/BSLs/SIs represented by several possible BIFT IDs are enumerated below:

BIFT ID=1: corresponding to SD 0, BSL 256, and SI 0//equivalent to SD 0/BSL 256/SI 0;

BIFT ID=2: corresponding to SD 0, BSL 256, and SI 1//equivalent to SD 0/BSL 256/SI 1;

BIFT ID=3: corresponding to SD 0, BSL 256, and SI 2//equivalent to SD 0/BSL 256/SI 2;

BIFT ID=4: corresponding to SD 0, BSL 256, and SI 3//equivalent to SD 0/BSL 256/SI 3;

BIFT ID=5: corresponding to SD 0, BSL 512, SI 0//equivalent to SD 0/BSL 512/SI 0;

BIFT ID=6: corresponding to SD 0, BSL 512, and SI 1//equivalent to SD 0/BSL 512/SI 1;

BIFT ID=7: corresponding to SD 1, BSL 256, and SI 0//equivalent to SD 1/BSL 256/SI 0;

BIFT ID=8: corresponding to SD 1, BSL 256, and SI 1//equivalent to SD 1/BSL 256/SI 1;

BIFT ID=9: corresponding to SD 1, BSL 256, and SI 2//equivalent to SD 1/BSL 256/SI 2;

BIFT ID=10: corresponding to SD 1, BSL 256, and SI 3//equivalent to SD 1/BSL 256/SI 3;

BIFT ID=11: corresponding to SD 1, BSL 512, and SI 0//equivalent to SD 1/BSL 512/SI 0; and BIFT ID=12: corresponding to SD 1, BSL 512, and SI 1//equivalent to SD 1/BSL 512/SI 1.

It should be noted that a value of the BIFT ID field corresponds to a triplet <SD, BSL, SI>. Unique <SD, BSL, SI> information can be obtained by using the BIFT-id field. The <SD, BSL, SI> information has the following functions: A length of a bit string in a BIER packet header is obtained by using the BSL, to learn of a length of the entire BIER packet header. Whether the bit string represents BFR-IDs ranging from 1 to 256 or ranging from 257 to 512 can be learned by using BSL and SI information. A corresponding forwarding table can be found by using SD information.

(2) Bit String Field

Each bit in a bit string is used to identify an edge BFR, for example, a bit in a low bit (rightmost) in the bit string is used to identify a BFER whose BFR-ID is equal to 1. The second bit from the right to the left in the bit string identifies a BFER whose BFR-ID is equal to 2. For a forwarding entry based on which a forwarding plane performs forwarding, several specific BFERs to which a packet is to be sent are determined based on a bit string in the packet. When receiving a packet header including the BIER packet header, the BFR in the BIER domain forwards the BIER packet based on a bit string and a BIFT ID that are carried in the BIER header.

It should be noted that a value 1 of a bit indicates that the packet needs to be sent to a BFER device represented by the BFR-ID, and a value 0 of the bit indicates that the packet does not need to be sent to the BFER device represented by the BFR-ID.

For example, BIFT ID=2. After receiving the BIER packet, the BFR may learn, based on the BIFT ID in the BIER header, that the BIER packet belongs to the SD 0, and a BSL used in the BIER header is 256 bits, and the BFR ID belongs to the set 1 (a set including the 256 edge BFRs whose BFR IDs range from 257 to 512).

(3) Transmission Class (TC) Field

The traffic class field is used to identify a priority of a packet.

(4) Stack (S)

S is a stack bottom flag. A value of the flag is 1 in the BIER packet header. In other words, the MPLS label is a stack bottom label of an entire label stack.

(5) Version (Ver) Field

The version field has a length of 4 bits, and is an IP version number. A value 4 represents the IPv4, and a value 6 represents the IPv6.

(6) Entropy Field

The entropy field is used for load sharing. Equivalent load sharing may be performed during BIER forwarding. In this case, during load sharing, a same path needs to be selected for two BIER packets with same entropy and a same bit string. To be specific, a plurality of packets belonging to same traffic have same entropy, and a plurality of packets of different traffic have different entropy. When a packet is forwarded, different traffic may be shared on different links based on entropy, and a plurality of packets of same traffic pass through a same link.

To ensure that different entropy identifies different flows, when a BFIR device allocates entropy, it is required that different entropy labels are allocated based on the different flows, and the entropy cannot be repeated.

(7) Protocol (Proto) Field

The protocol field is used to identify a payload format after the BIER packet header. For example, a value 4 and a value 6 respectively represent an IPv4 packet and an IPv6 packet. A value 2 represents an MPLS packet with an upstream allocated label, and the value 2 is a proto value used in a multicast virtual private network (MVPN) over BIER. A reason for using an upstream label is as follows: Multicast is point-to-multipoint transmission. A provider edge (PE) device at a transmitting end may allocate a unique label, and send the unique label to a PE device at a receiving end on a control plane. The label allocated by the PE device at the transmitting end is used in a data packet, and is identified by the PE device at the receiving end. The label is not allocated by the PE device at the receiving end, but allocated by the PE device at the transmitting end, and therefore is referred to as an upstream label.

(8) Nibble

The nibble field has a fixed 4-bit value 0101. This field is used to distinguish between services carried through MPLS, and distinguish between BIER, IPv4, and IPv6. Because in MPLS encapsulation and forwarding, an IPv4 or IPv6 header after a label stack is sometimes checked to support ECMP.

(9) BFIR-Id

The BFIR-id field indicates a BFR-ID of a BFIR. If the BFIR device encapsulates and sends a BIER packet in a sub-domain, a BFIR-id field needs to be filled with the BFR-ID of the device in the sub-domain. The BFIR-id may identify a specific BFIR from which a multicast flow is sent, to uniquely determine the multicast flow.

(10) Bit String

The bit string field indicates a character string of a destination device set of a BIER packet.

Figure 3:
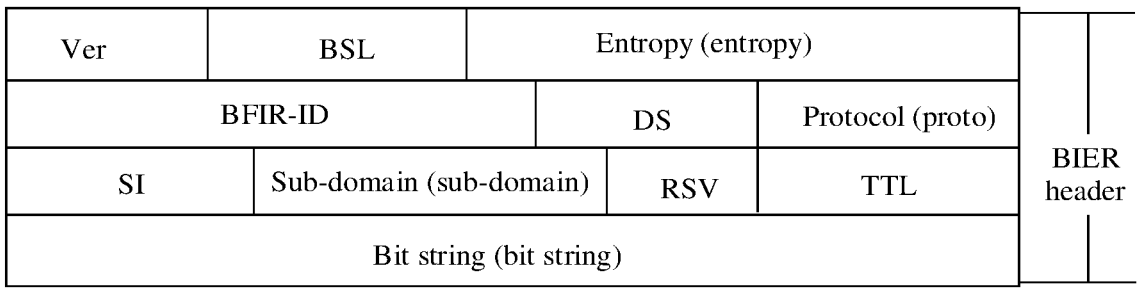
FIG. 3 is a schematic block diagram of another possible BIER header format.

FIG. 3 is a schematic block diagram of another possible BIER header format.

Compared with the BIER header format shown in FIG. 2, the BIER header format shown in FIG. 3 does not include the BIFT-ID field, but explicitly includes the three fields: the SD field, the BSL field, and the SI field. In other words, the BIER header format shown in FIG. 3 directly includes the three fields: the SD field, the BSL field, and the SI field, and an SD/BSL/SI value does not need to be obtained through mapping from the BIFT ID field.

It should be noted that fields included in the BIER header format shown in FIG. 3 are similar to the fields included in the BIER header format shown in FIG. 2. For specific descriptions related to the fields in the BIER header format shown in FIG. 3, refer to the descriptions in FIG. 2. Details are not described herein again.

A process of establishing a BIER forwarding table and forwarding a BIER packet based on a BIER technology is described below in detail by using FIG. 4 as an example.

Figure 4:
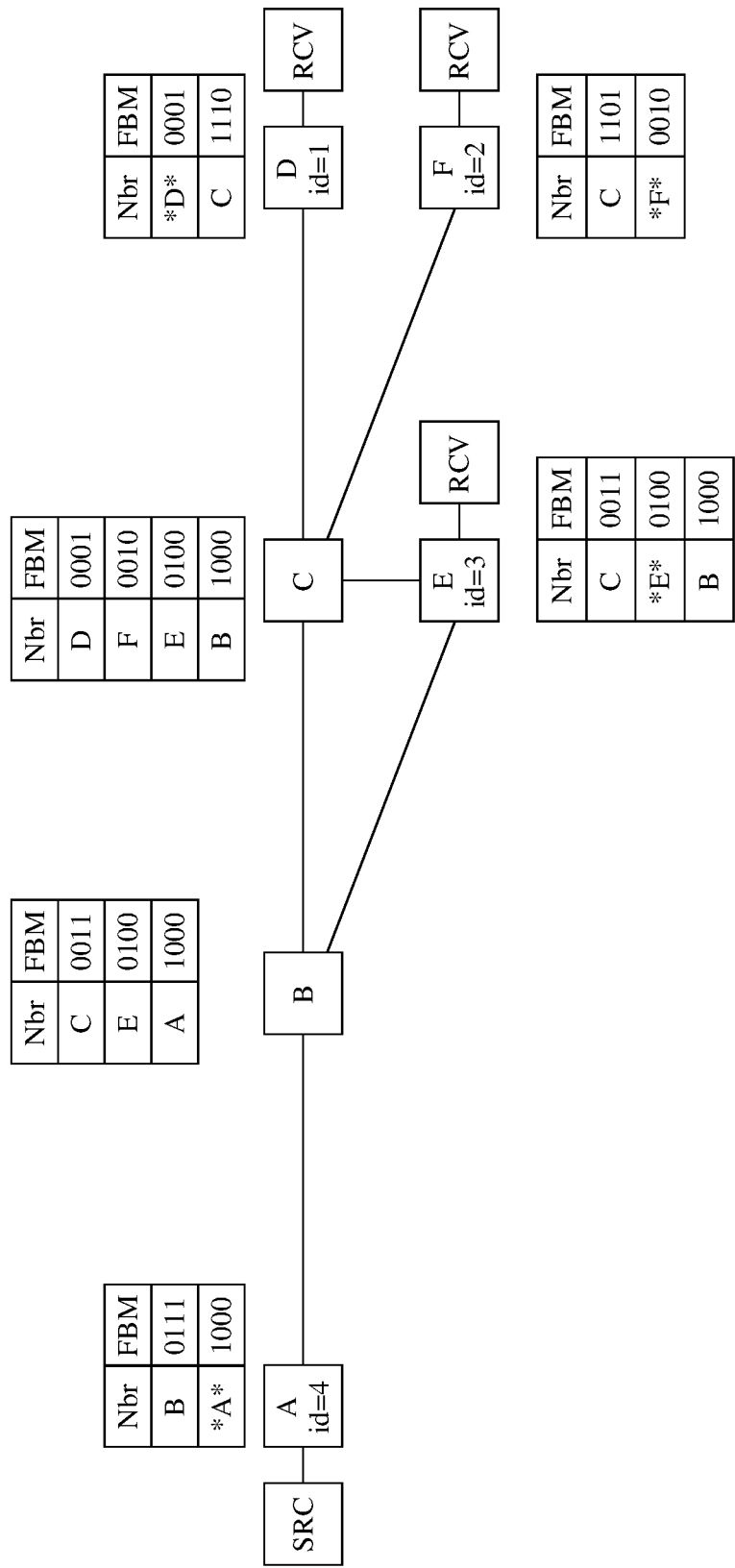
FIG. 4 shows a process of establishing a BIER forwarding table and forwarding a BIER packet based on the BIER technology.

A BIER domain shown in FIG. 4 may include a device A to a device F. The device A, the device D, the device E, and the device F are edge BFRs in the BIER domain, and the device B and the device C are BIER intermediate forwarding devices. Specifically, the device A is located at an ingress in the BIER domain, is responsible for performing BIER encapsulation on an original multicast data packet, and corresponds to the BFIR in FIG. 1. The device D, device E, and device F are located at an egress in the BIER domain, are responsible for decapsulating the original multicast data packet from the BIER packet, and correspond to the BFER in FIG. 1.

In embodiments of this application, a unique BFR-ID may be allocated to each edge BFR in the BIER domain. For example, in FIG. 4, BFR-IDs configured for the device A, the device D, the device E, and the device F are respectively 4, 1, 3, and 2. No BFR-ID is allocated to the intermediate forwarding BFRs, for example, the device B and the device C.

It should be noted that in embodiments of this application, "ID" and "id" sometimes may be interchanged. It should be noted that when a difference is not emphasized, meanings to be expressed by them are the same. The BFR-ID in this application may refer to an id in FIG. 4.

A bit string encapsulated in a BIER header of data traffic marks all destination devices of the traffic. For example, a bit string corresponding to the device D whose BFR-ID is 1 is 0001, a bit string corresponding to the device F whose BFR-ID is 2 is 0010, a bit string corresponding to the device E whose BFR-ID is 3 is 0100, and a bit string corresponding to the device A whose BFR-ID is 4 is 1000.

It should be understood that a BFR-ID value allocated to each edge BFR in the BIER domain may be flooded to another BFR in the BIER domain based on a routing protocol. Flooded BIER information further includes an IP address and encapsulation information of the edge BFR. For example, flooded BIER information of the device A carries an IP address and a BIFT-id of the device A. The BFR (for example, the device F in FIG. 4) in the BIER domain may establish a BIFT entry based on the flooded BIER information, so that after receiving a BIER packet, the device F in FIG. 4 forwards the BIER packet to a destination device based on the established BIFT entry.

If the device A needs to send a BIER packet to BFERs whose BFR-IDs are respectively 1, 2, and 3, the device A needs to first send the BIER packet to a neighbor (the device B) of the device A, where an edge BFR whose BFR-ID is 4 is the device A. Therefore, a BIFT entry established by the device A is as follows:

forwarding entry 1: neighbor (Nbr)=B, and forwarding bit mask (FBM)=011; and forwarding entry 2: Nbr*=A, and FBM=1000.

The forwarding entry 1 indicates that when any one of the first bit, the second bit, or the third bit from the right to the left of a bit string in a BIER packet is 1, the BIER packet is sent to the neighbor (the device B) of the device A, where Nbr=B indicates that the neighbor of the device A is the device B.

The forwarding entry 2 indicates that when the fourth bit from the right to the left of a bit string in a BIER packet is 1, the BIER packet is sent to the device A. The device A is the device A. Therefore, the device A may remove a BIER header and performs forwarding based on information in the original multicast data packet. It should be noted that in the forwarding entry 2, * is used to identify that Nbr is the device itself. For example, for the device A, Nbr*=A indicates that a neighboring device of the device A is the device A. Similarly, another device in FIG. 4 may also establish a BIFT entry based on a neighboring device of the another device. For the BIFT entry established by the another device, refer to FIG. 4. Details are not described herein.

After the device A, as a BFIR at the ingress in the BIER domain, receives the original multicast data packet, the device A encapsulates a BIER header before the original multicast data packet. It should be understood that, for ease of description, the device A is referred to as an ingress device A for short below. In an example, after receiving the original multicast data packet, the ingress device A may learn of the destination device of the original multicast data packet based on a BFR-ID flooded in a border gateway protocol BGP message. For example, receivers of the original multicast data packet are the destination device E whose BFR-ID is 3, the destination device F whose BFR-ID is 2, and the destination device D whose BFR-ID is 1. The ingress device A encapsulates a bit string in the BIER header as 0111, and forwards an encapsulated BIER packet to the neighboring device B based on the forwarding entry 1. After receiving the BIER packet, the device B determines, based on the bit string being 0111 and the BIFT entries, that the BIER packet needs to be separately sent to the device C and the device E. When sending the BIER packet to the device C, the device B may perform an AND operation on the bit string (0111) in the BIER header and an FBM field corresponding to Nbr=C in the BIFT entry. In embodiments of this application, a result of the AND operation is 0011. Therefore, the device B may change the bit string in the BIER header to 0011 and send the bit string (0011) to the device C. Similarly, when sending the BIER packet to the device E, the device B may change the bit string in the BIER header to 0100. After receiving the BIER packet, the device E determines, based on the bit string being 0100, that the BIER packet is to be sent to the neighboring device E. The device E determines that a neighboring device E is the device E based on the identifier * in the forwarding table. Therefore, the device E, as a BFER at the egress in the BIER domain, may decapsulate the BIER packet to obtain the original multicast data packet, and perform forwarding based on information in the inner original multicast data packet.

In BIER-MPLS encapsulation, the first 32 bits in a BIER header is an MPLS label code, and the first 20 bits in the first 32 bits is an MPLS label value. The MPLS label value changes in a forwarding process. For example, when the ingress device A sends a packet to the device B, an MPLS label value of the device B needs to be encapsulated. When the device B sends a packet to the device C, an MPLS label value of the device C needs to be encapsulated. In embodiments of this application, MPLS label values allocated to the device A, the device B, the device C, the device D, the device E, and the device F are respectively 100, 200, 300, 400, 500, and 600. The MPLS label values need to be carried in the foregoing BIER encapsulation information and flooded to another BFR in the BIER domain based on a routing protocol, so that the device A can learn of the MPLS label value of the device B. An MPLS label that identifies BIER information is also referred to as a BIER label.

In embodiments of this application, a bit position configured by the edge BFR is flooded in the BIER domain in advance based on an interior gateway protocol (IGP) or a border gateway protocol (BGP), so that each BFR in the BIER domain forms a bit index forwarding table (BIFT) for guiding forwarding of the original multicast data packet in the BIER domain. The information flooded in the BIER domain based on the IGP or the BGP may be referred to as BIER information. After receiving the BIER packet encapsulated with the BIER header, the BFR forwards the BIER packet to the destination device based on the BIFT entry.

In embodiments of this application, the interior gateway protocol IGP may include but is not limited to an open shortest path first (OSPF) protocol, an intermediate system to intermediate system (ISIS) protocol, or the like.

It should be understood that the BIER domain refers to a network area in which BIER information can be flooded based on the IGP or the BGP and a BIFT entry can be established, and the BIER domain includes a BFIR and a BFER. The BIER information may include but is not limited to the BFR ID of each of the foregoing edge BFRs. In an example, if the IGP is deployed and the BIER information is flooded in an autonomous system (AS) domain, the AS domain is a BIER domain.

Generally, a large-scale network is divided into a plurality of domains. For example, the network can be divided into different ASs based on different administrative domains. An autonomous system border router (ASBR) may be at a border of the AS. The IGP may be deployed and the BIER information may be flooded in different ASs. If the BGP is deployed between a plurality of AS domains, but the BIER information is not flooded, the plurality of AS domains may be a plurality of different BIER domains.

A technology related to BIERv6 encapsulation is described below in detail with reference to FIG. 5.

It should be understood that BIERv6 encapsulation is a solution formed by combining advantages of native IPv6 and BIER. A packet format in BIERv6 encapsulation is: an IPv6 header+a BIER header+an original multicast data packet. The BIER header may be included in an IPv6 extension header, and the original multicast data packet is used as a payload (payload) of an outer IPv6 header.

In this type of encapsulation, the IPv6 header and the IPv6 extension header including the BIER header jointly form an outer packet header of the inner original multicast data packet. The outer packet header of the inner original multicast data packet may also be referred to as a BIERv6 header in embodiments of this application.

The IPv6 extension header including the BIER header is not specifically limited in embodiments of this application. For example, the IPv6 extension header may be a destination options header (DOH). For another example, the IPv6 extension header may be a routing header (RH).

Figure 5:
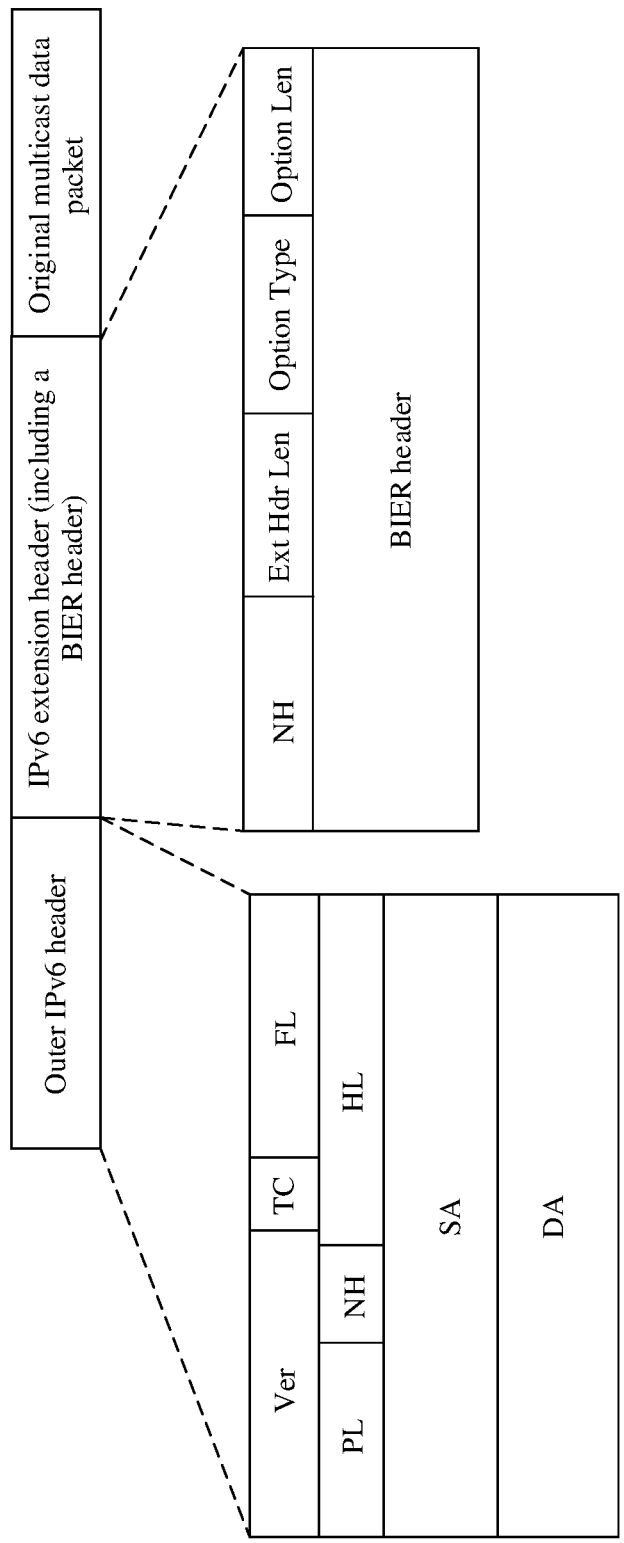
FIG. 5 is a schematic diagram of a possible packet format in BIERv6 encapsulation according to an embodiment of this application.

FIG. 5 is a schematic block diagram of possible BIERv6 encapsulation. Refer to FIG. 5. The BIER header may be located in the IPv6 extension header, for example, located in the DOH.

It should be understood that an option in the DOH is a type-length-value (TLV) format. The BIER header is used as option data in an option TLV of the DOH, an option type in the option TLV identifies a format of the BIER header, and an option length in the option TLV identifies a length of the BIER header.

It should be noted that in BIERv6 encapsulation, the format of the BIER header in the DOH is not specifically limited in embodiments of this application, provided that the BIER header includes a bit string field. The format of the BIER header may be the format shown in FIG. 2, the format shown in FIG. 3, or another format. For example, in BIERv6 encapsulation, a proto field, a DSCP field, and the like may be further deleted from the BIER header, provided that the BIER header includes a bit string used for bit index explicit replication. For specific descriptions related to the format of the BIER header, refer to the descriptions in FIG. 2 or FIG. 3. Details are not described herein again.

Fields included in the outer IPv6 header are described in detail below.

Version number (Ver) field: The version number field indicates an IP version number, and a value 6 of the version number field represents the IPv6.

Traffic class (TC) field: The traffic class field identifies a priority of a packet.

Flow label (FL) field: A same flow label may be used to label a plurality of packets belonging to same traffic, and another flow label value is used to label a plurality of packets of different traffic. When a packet is forwarded, different traffic may be shared on different links based on a flow label, and a plurality of packets of same traffic pass through a same link. To be specific, the flow label is used to distinguish between real-time traffic, and different flow labels may determine different data flows. In this way, a network device in a BIER domain can more efficiently distinguish between different data flows based on the flow label field.

Payload length (PL) field: The payload length field indicates a length of a packet.

Next header (NH) field: The next header field indicates a type of a next header of a packet, for example, may represent an IPv6 extension header.

Hop limit (HL) field: The hop limit field indicates a limit on a quantity of packets.

Source address (SA) field: The source address field identifies a source address of a packet.

Destination address (DA) field: The destination address field identifies a destination address of a packet.

The BIER domain shown in FIG. 4 is used as an example. The device A is used as a head node in an IPv6 network. After receiving a user multicast data packet, the device A encapsulates the packet after a BIERv6 header, namely, an IPv6 extension header including an outer IPv6 header and the BIER header, an encapsulated BIERv6 packet is obtained. A BIER packet header included in the IPv6 extension header carries a bit string representing a set of destination devices.

The device A sends the encapsulated BIERv6 packet to the device B based on the BIER packet header and bit string information in the BIER packet header. During sending, a destination address field in the IPv6 header may use a unicast address of the device B (for example, B::100). The device B sends the packet to the device C and the device E based on the BIER packet header and the bit string information in the BIER packet header. During sending, the destination address field in the IPv6 header may use a unicast address of the device C (for example, C::100) and a unicast address of the device E (for example, E::100). Similarly, the device C sends the packet to the device D and the device F based on the BIER packet header and the bit string information in the BIER packet header. During sending, the destination address field in the IPv6 header may use a unicast address of the device D (for example, D::100) and a unicast address of the device F (for example, D::100).

Based on the foregoing description about BIER/BIERv6, it may be learned that a BIER/BIERv6 technology for carrying multicast service traffic is a stateless multicast forwarding technology. That is, no multicast distribution tree is generated in a network, and there is no multicast flow-based entry or status. From a perspective of essence of forwarding, in the BIER technology, a BIER bit index forwarding table BIFT is generated on a network device based on the IGP to perform unicast forwarding for a plurality of times on different network devices level by level based on a bit string in a BIER packet and bit identifiers, to implement replication to a plurality of receivers. A BIFT entry provides forwarding guidance for any multicast flow that applies BIER forwarding, without distinguishing the multicast flow. As a result, such forwarding based on the BIER technology makes it difficult for the network device to perform BIER multicast flow statistics collection.

In an example, a network forwarding device that forwards BIER traffic cannot distinguish between the BIER forwarding flow and a common unicast forwarding flow first. Consequently, the traffic is uniformly counted as a unicast flow. Second, the network forwarding device cannot distinguish between traffic of different multicast groups in BIER forwarding traffic. This makes operation and maintenance difficult in the BIER multicast technology. When a user cannot receive a multicast flow, a position at which traffic is interrupted cannot be quickly learned of. When a packet loss occurs in a multicast flow received by the user, a position at which the packet loss occurs cannot be quickly learned of. To find the position at which the traffic is interrupted or the position at which the packet loss occurs, impact of other traffic needs to be eliminated. Consequently, other services need to be interrupted. Then, a forwarding table of each device is queried and statistics collection on all unicast traffic on the device is required, to analyze, check, and locate a fault. Interruption of other services is intolerant for other users. In addition, it is very difficult to infer, by querying the tables level by level and based on all the unicast traffic on the device, the position at which the traffic is interrupted or the position at which the packet loss occurs.

In view of this, this application provides a BIER multicast traffic statistics collection method, to collect statistics about BIER multicast traffic. The following describes in detail the BIER multicast traffic statistics collection method provided in an embodiment of this application with reference to FIG. 6.

Figure 6:
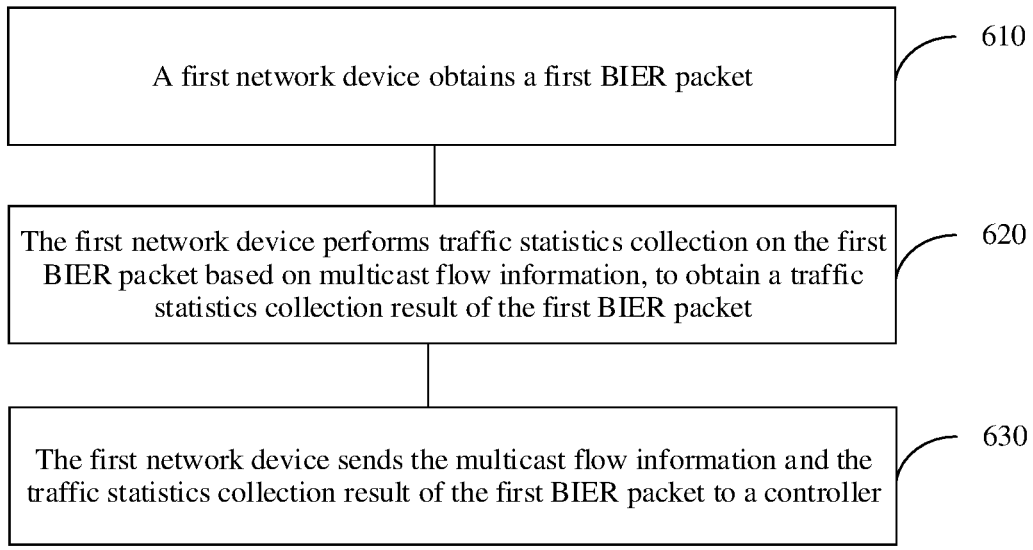
FIG. 6 is a schematic flowchart of a BIER multicast traffic statistics collection method according to an embodiment of this application.

FIG. 6 is a schematic flowchart of a BIER multicast traffic statistics collection method according to an embodiment of this application. As shown in FIG. 6, the method may include steps 610 to 640. The following separately describes steps 610 to 640 in detail.

Step 610: A first network device obtains a first BIER packet.

The first network device may be an ingress device (for example, a BFIR) in a BIER domain, or may be an intermediate forwarding device (for example, a BFR) or an egress device (for example, a BFER) in the BIER domain. This is not specifically limited in this embodiment of this application.

Optionally, the first network device is the ingress device (for example, the BFIR) in the BIER domain. Before the first network device obtains the first BIER packet, the first network device may further receive a traffic statistics collection instruction sent by a controller, and performs BIER encapsulation on first multicast data based on the traffic statistics collection instruction, to obtain the first BIER packet.

It should be understood that the traffic statistics collection instruction may include the first multicast data. The traffic statistics collection instruction is used to instruct to perform traffic statistics collection on the first multicast data.

It should be understood that, in multicast, a source (S) represents a source of multicast data, and a group (G) represents a destination of the multicast data. Therefore, a multicast source group may be represented as (S, G). One multicast source group (S, G) may be used to uniquely identify the first multicast data. Alternatively, the first multicast data may be uniquely identified by (VPN, S, G) based on different virtual private networks (virtual private networks, VPNs). Therefore, the traffic statistics collection instruction may include (S, G) or (VPN, S, G) that identifies the first multicast data, and the traffic statistics collection instruction is used to instruct to perform traffic statistics collection on the first multicast data identified by (S, G) or (VPN, S, G).

Step 620: The first network device performs traffic statistics collection on the first BIER packet based on multicast flow information, to obtain a traffic statistics collection result of the first BIER packet.

The multicast flow information is used to identify a multicast flow to which the first BIER packet belongs. Specifically, in an example, the multicast flow information includes any one of the following: a BFIR-ID and an entropy label in a BIER header of the first BIER packet; an SA and a flow label in an IPv6 header of the first BIER packet; (S, G) of the first multicast data in an inner layer of the first BIER packet; or (VPN, S, G) of the first multicast data in an inner layer of the first BIER packet.

Optionally, the first network device is the intermediate forwarding device (for example, the BFR) or the egress device (for example, the BFER) in the BIER domain. Before the first network device performs traffic statistics collection on the first BIER packet, the first network device further needs to determine whether traffic statistics collection needs to be performed on the first BIER packet.

There are a plurality of implementations in which the first network device determines whether the first network device needs to perform traffic statistics collection on the first BIER packet. This is not specifically limited in this application.

In a possible implementation, the controller delivers a statistics collection instruction for a specified flow to all devices in a network, and the first network device may determine, based on the statistics collection instruction for the specified flow, that the first network device needs to perform traffic statistics collection on the first BIER packet. The statistics collection instruction for the specified flow may be, for example, first indication information, the first indication information includes the multicast flow information, and the first indication information indicates to perform traffic statistics collection on the first BIER packet.

In another possible implementation, the controller delivers the statistics collection instruction for the specified flow only to the ingress device (for example, the BFIR) in the BIER domain. The ingress device (for example, the BFIR) in the BIER domain includes, based on the statistics collection instruction, a traffic statistics collection identifier in a first BIER packet of the specified flow. After receiving the first BIER packet, the intermediate forwarding device (for example, the BFR) or the egress device (for example, the BFER) in the BIER domain may determine, depending on whether the traffic statistics collection identifier is carried in the first BIER packet, whether traffic statistics collection needs to be performed on the first BIER packet. In this way, the controller does not need to deliver the statistics collection instruction for the specified flow to all the devices in the network, to reduce configuration complexity. The following describes the foregoing two implementations in detail with reference to specific embodiments, and details are not described herein again.

Step 630: The first network device sends the multicast flow information and the traffic statistics collection result of the first BIER packet to the controller.

According to the foregoing technical solution, the first network device can collect statistics about BIER multicast traffic statistics. In an aspect, a problem that statistics about BIER/BIERv6 multicast service traffic cannot be collected can be resolved. In a scenario in which BIER/BIERv6 multicast traffic interruption or a packet loss occurs, the controller can effectively locate a lost or interrupted data packet based on multicast traffic statistics. In addition, BIER/BIERv6 multicast operation and maintenance capabilities can be improved.

Figure 7:
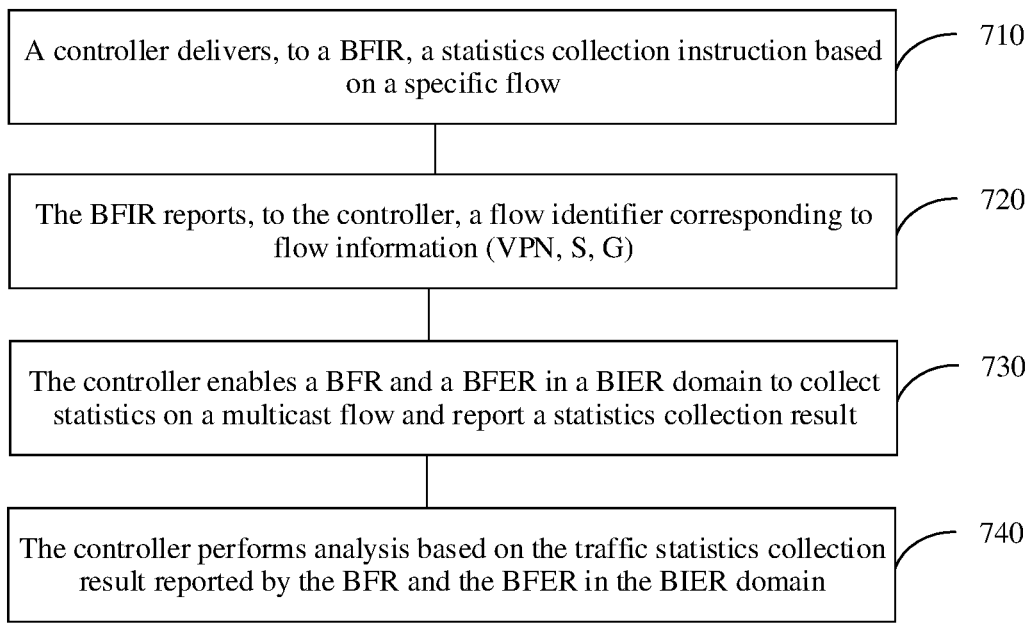
FIG. 7 is a schematic flowchart of another BIER multicast traffic statistics collection method according to an embodiment of this application.

The following describes in detail a specific implementation process of a BIER multicast traffic statistics collection method provided in an embodiment of this application with reference to FIG. 7 by using an example in which a controller delivers a statistics collection instruction for a specified flow to all devices in a network.

It should be understood that the example in FIG. 7 is merely intended to help a person skilled in the art understand this embodiment of this application, but is not intended to limit this embodiment of this application to a specific value or a specific scenario in the example. A person skilled in the art can clearly make various equivalent modifications or changes according to the example provided in FIG. 7 below, and such modifications or changes also fall within the scope of embodiments of this application.

FIG. 7 is a schematic flowchart of another BIER multicast traffic statistics collection method according to an embodiment of this application. As shown in FIG. 7, the method may include steps 710 to 740. The following separately describes steps 710 to 740 in detail.

Step 710: A controller delivers, to a BFIR, a statistics collection instruction based on a specific flow.

In this embodiment of this application, a multicast flow forwarded in a BIER domain may be referred to as a virtual private network multicast source group (VPN source group, VPN, S, G). (VPN, S, G) sometimes may also be referred to as flow information (VPN, S, G).

Step 720: The BFIR reports, to the controller, a flow identifier corresponding to the flow information (VPN, S, G).

It should be understood that the flow identifier may correspond to the foregoing multicast flow information.

In an example, in a scenario in which BIER encapsulation is performed, the BFIR may allocate different entropy fields to different multicast flows, and a BFIR-id may identify a BFIR from which the multicast flow is sent, so that the multicast flow can be uniquely determined. Therefore, the BFIR may uniquely indicate the multicast flow by using a BFIR-id field and an entropy field in a BIER header. A BFR and a BFER in the BIER domain may obtain a mapping relationship 1 (BFIR-ID+entropy↔multicast flow (VPN, S, G)) from the BFIR, and apply the mapping relationship 1 to the BFR and the BFER in the BIER domain, so that the BFR and the BFER in the BIER domain can uniquely identify a determined multicast flow based on the mapping relationship 1.

In the foregoing scenario in which BIER encapsulation is performed, "BFIR-ID+entropy" in the BIER header is used as a flow identifier, and may be used to identify different multicast flows. The BFIR may further reports, to the controller, the flow identifier corresponding to the flow information (VPN, S, G).

For example, the information reported by the BFIR to the controller is shown in Table 1.

TABLE 1

Key information (ACL rule) about a flow identifier

| BFIR-ID | Entropy label | Flow information |
|---------|---------------|------------------|
| ID 1 | Entropy 1 | VPN 1, S1, G1 |
| ID 1 | Entropy 2 | VPN 1, S1, G2 |
| ID 2 | Entropy 1 | VPN 1, S1, G1 |
| ID 2 | Entropy 2 | VPN 1, S1, G2 |

In this implementation, the controller may uniquely identify the multicast flow by using "BFIR-ID+entropy", and enable the BFR and the BFER in the BIER domain to perform traffic statistics collection on the multicast flow by delivering "BFIR-ID+entropy". The BFR and the BFER in the BIER domain may match a corresponding multicast flow based on "BFIR-ID+entropy", and perform traffic statistics collection on the matched multicast flow.

In another example, in a scenario in which BIERv6 encapsulation is performed, if the BFIR may allocate different flow label (flow label, FL) fields to different multicast flows, the multicast flow may be uniquely determined because a source address SA in an outer IPv6 header may identify a BFIR from which the multicast flow is sent. Therefore, the BFIR may uniquely indicate the multicast flow by using an SA field and the flow label field in the outer IPv6 header. The BFR and the BFER in the BIER domain may obtain a mapping relationship 2 (SA+flow label↔multicast flow (VPN, S, G)) from the BFIR, and apply the mapping relationship 2 to the BFR and the BFER in the BIER domain, so that the BFR and the BFER in the BIER domain can uniquely identify a determined multicast flow based on the mapping relationship 2.

In the foregoing scenario in which BIERv6 encapsulation is performed, "SA+flow label" in the outer IPv6 header is used as another flow identifier, and may be used to identify different multicast flows. The BFIR may further reports, to the controller, the flow identifier corresponding to the flow information (VPN, S, G).

For example, the information reported by the BFIR to the controller is shown in Table 2.

TABLE 2

Key information (ACL rule) about a flow identifier

| BFIR SA | IPv6 flow label | Flow information |
|---|---|---|
| BFIR SA 1 | Flow-label 1 | VPN 1, S1, G1 |
| BFIR SA 1 | Flow-label 2 | VPN 1, S1, G2 |
| BFIR SA 2 | Flow-label 1 | VPN 1, S1, G1 |
| BFIR SA 2 | Flow-label 2 | VPN 1, S1, G2 |

In this implementation, the controller may uniquely identify the multicast flow by using "SA+flow label", and enable the BFR and the BFER in the BIER domain to perform traffic statistics collection on the multicast flow by delivering "SA+flow label". The BFR and the BFER in the BIER domain may match a corresponding multicast flow based on "SA+flow label", and perform traffic statistics collection on the matched multicast flow.

In another example, in the scenario in which BIER encapsulation is performed, if the BFIR cannot allocate different pieces of entropy (entropy) to different multicast flows, or in the scenario in which BIERv6 encapsulation scenario is performed, the BFIR cannot allocate different flow labels (flow labels) to different multicast flows, (VPN, S, G) may be directly used to identify the multicast flow. In this case, the information reported by the BFIR to the controller is shown in Table 3.

TABLE 3

Key information (ACL rule) about a flow identifier

| BFIR-ID | Flow information |
|---|---|
| ID 1 | VPN 1, S1, G1 |
| ID 1 | VPN 1, S1, G2 |
| ID 1 | VPN 1, S1, G3 |

In this implementation, the controller may uniquely identify the multicast flow by using (VPN, S, G) and enable the BFR and the BFER in the BIER domain to perform traffic statistics collection on the multicast flow by delivering (VPN, S, G). The BFR and the BFER in the BIER domain may match a corresponding multicast flow based on (VPN, S, G), and perform traffic statistics collection on the matched multicast flow.

Step 730: The controller enables the BFR and the BFER in the BIER domain to collect statistics about the multicast flow and report a statistics collection result.

When statistics about traffic of a specific multicast flow need to be collected, the BFR and the BFER in the BIER domain may perform traffic statistics collection on the multicast flow. There are a plurality of specific implementations. The following describes two possible implementations.

In an implementation, the controller may deliver key information about a flow identifier to the BFR and the BFER in the BIER domain based on information reported by the BFIR, so that the BFR and the BFER in the BIER domain match a corresponding multicast flow based on the key information about the flow identifier, and perform traffic statistics collection on the matched multicast flow.

In another implementation, key information of a flow identifier may be directly enabled to be configured on the BFR and the BFER in the BIER domain, so that the BFR and the BFER in the BIER domain match a corresponding multicast flow based on the key information about the flow identifier, and perform traffic statistics collection on the matched multicast flow.

The following describes a process in which the controller delivers the key information about the flow identifier to the BFR and the BFER in the BIER domain.

In an example, (VPN, S, G) is used to uniquely identify a multicast flow. When statistics about traffic of a specific flow are to be collected, the controller configures the BFR and the BFER in the BIER domain based on (VPN, S, G) reported by the BFIR, to enable the BFR and the BFER in the BIER domain to collect statistics, and delivers (VPN, S, G) information to the BFR and the BFER in the BIER domain. The BFR and the BFER in the BIER domain generate, based on the (VPN, S, G) information delivered by the controller, an access control list (access control list, ACL) rule such as the access control list rule shown in Table 3, collect, based on the ACL rule, statistics about a multicast flow that meets a matching condition, and periodically report traffic statistics. For example, the BFR and the BFER in the BIER domain may apply for a statistics collection resource on a control plane and deliver the statistics collection resource to a forwarding plane. The forwarding plane performs statistics collection on the multicast flow that complies with the ACL rule and periodically reports the traffic statistics.

It should be understood that the traffic statistics may include a BFR-id, (VPN, S, G), and traffic statistics information.

Optionally, in some embodiments, the BFR and the BFER in the BIER domain may further periodically report information on traffic ingress and egress interfaces to the controller.

After receiving the information on the traffic ingress and egress interfaces reported by the BFR and the BFER in the BIER domain, the controller may map the information on the traffic interfaces to an existing physical topology, to restore a service path of the flow.

In another example, "BFIR-ID+entropy" is used as a flow identifier to uniquely identify a multicast flow. When statistics about traffic of a specific flow are to be collected, the controller configures the BFR and the BFER in the BIER domain based on a correspondence between "BFIR-ID+entropy" and (VPN, S, G) that are reported by the BFIR, to enable the BFR and the BFER in the BIER domain to collect statistics, and delivers "BFIR-ID+entropy" information to the BFR and the BFER in the BIER domain. The BFR and the BFER in the BIER domain generate, based on the "BFIR-ID+entropy" information delivered by the controller, an ACL rule such as the ACL rule shown in Table 1, collect, based on the ACL rule, statistics about a multicast flow that meets a matching condition, and periodically report traffic statistics. For example, the BFR and the BFER in the BIER domain may apply for a statistics collection resource on a control plane and deliver the statistics collection resource to a forwarding plane. The forwarding plane performs statistics collection on the multicast flow that complies with the ACL rule and periodically reports the traffic statistics.

It should be understood that the traffic statistics may include a BFIR-id, entropy, and traffic statistics information.

Optionally, in some embodiments, the BFR and the BFER in the BIER domain may further periodically report information on traffic ingress and egress interfaces to the controller.

After receiving the information on the traffic ingress and egress interfaces reported by the BFR and the BFER in the BIER domain, the controller may map the information on the traffic interfaces to an existing physical topology, to restore a service path of the flow.

In another example, "SA+flow label" is used as a flow identifier to uniquely identify a multicast flow. When statistics about traffic of a specific flow are to be collected, the controller configures the BFR and the BFER in the BIER domain based on a correspondence between "SA+flow label" and (VPN, S, G) that are reported by the BFIR, to enable the BFR and the BFER in the BIER domain to collect statistics, and delivers "SA+flow label" information to the BFR and the BFER in the BIER domain. The BFR and the BFER in the BIER domain generate, based on the "SA+flow label" information delivered by the controller, an ACL rule such as the ACL rule shown in Table 2, collect, based on the ACL rule, statistics about a multicast flow that meets a matching condition, and periodically report traffic statistics. For example, the BFR and the BFER in the BIER domain may apply for a statistics collection resource on a control plane and deliver the statistics collection resource to a forwarding plane. The forwarding plane performs statistics collection on the multicast flow that complies with the ACL rule and periodically reports the traffic statistics.

It should be understood that the traffic statistics may include an SA, a flow label, and traffic statistics information.

Optionally, in some embodiments, the BFR and the BFER in the BIER domain may further periodically report information on traffic ingress and egress interfaces to the controller.

After receiving the information on the traffic ingress and egress interfaces reported by the BFR and the BFER in the BIER domain, the controller may map the information on the traffic interfaces to an existing physical topology, to restore a service path of the flow.

In the foregoing technical solution, because "SA+flow label" is in the outer IPv6 header, processing efficiency of parsing the information by the forwarding plane is high when a manner of "SA+flow label" is used to identify the multicast flow.

It should be noted that in BIER forwarding, in a scenario in which forwarding is performed across non-BFR devices, the non-BFR device does not perform multicast traffic statistics collection.

Step 740: The controller performs analysis based on the traffic statistics collection result reported by the BFR and the BFER in the BIER domain.

In this embodiment of this application, the controller may perform analysis based on the traffic statistics collection result reported by the BFR and the BFER in the BIER domain. The analysis may include but is not limited to: multicast flow statistics visualization or multicast flow fault analysis.

The multicast flow statistics visualization is as follows: The controller uses a head node and a multicast flow as key dimensions and displays devices that a specific multicast flow sent by a head node passes through and traffic of each device, to display an entire multicast flow replication process and traffic statistics. The multicast flow fault analysis is as follows: The controller uses a head node, a receiving end, and a multicast flow as key dimensions, checks a service path and traffic statistics that are received by the receiving end and that are of the multicast flow in a process of forwarding multicast flow from the BFIR to the BFER, and analyzes a fault point and a fault cause based on the traffic statistics.

For example, (VPN, S, G) is used to uniquely identify a multicast flow. After receiving the traffic statistics reported by the BFR and the BFER in the BIER domain, the controller may map the BFR-id, the flow information (VPN, S, G), and the traffic statistics to the restored service path.

For example, "BFIR-ID+entropy" is used as a flow identifier to uniquely identify a multicast flow. After receiving the traffic statistics reported by the BFR and the BFER in the BIER domain, the controller may map the reported "BFIR-id, entropy, and traffic statistics" to the flow information (VPN, S, G), and map the corresponding flow information (VPN, S, G) and the traffic statistics to the restored service path.

For example, "SA+flow label" is used as a flow identifier to uniquely identify a multicast flow. After receiving the traffic statistics reported by the BFR and the BFER in the BIER domain, the controller may map the reported "SA, flow label, and traffic statistics" to the flow information (VPN, S, G), and map the corresponding flow information (VPN, S, G) and the traffic statistics to the restored service path.

According to the foregoing technical solution, the controller may determine, based on traffic analysis of a multicast flow on the service path, whether a packet loss or traffic interruption occurs in the multicast flow. If such a fault occurs, the controller may assist a user in demarcating and locating a fault point. For example, an alarm may be generated and an upstream device may be compared with a downstream device, to assist the user in demarcating and locating the fault point.

Figure 8:
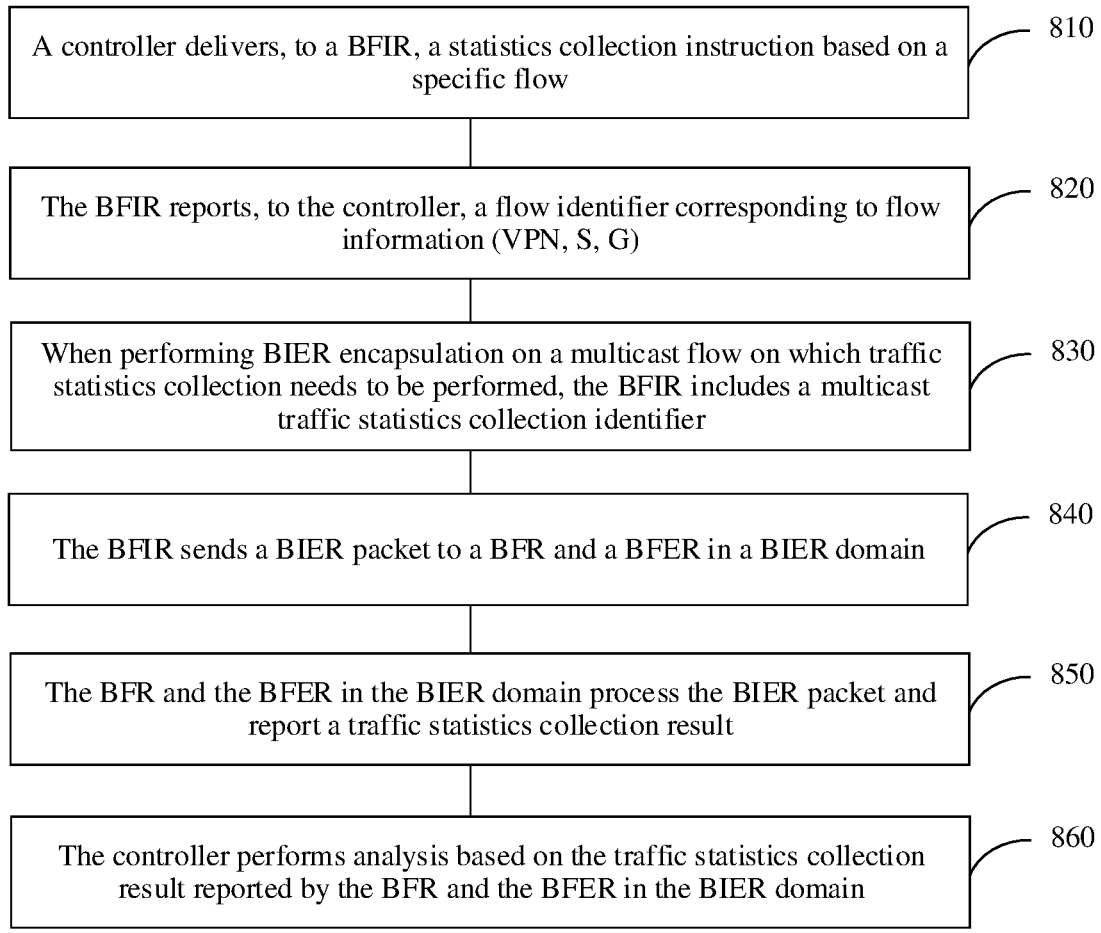
FIG. 8 is a schematic flowchart of another BIER multicast traffic statistics collection method according to an embodiment of this application.

The following describes in detail another specific implementation process of a BIER multicast traffic statistics collection method provided in an embodiment of this application with reference to FIG. 8 by using an example in which a controller delivers a statistics collection instruction for a specified flow only to a BFIR.

It should be understood that the example in FIG. 8 is merely intended to help a person skilled in the art understand this embodiment of this application, but is not intended to limit this embodiment of this application to a specific value or a specific scenario in the example. A person skilled in the art can clearly make various equivalent modifications or changes according to the example provided in FIG. 8 below, and such modifications or changes also fall within the scope of embodiments of this application.

FIG. 8 is a schematic flowchart of another BIER multicast traffic statistics collection method according to an embodiment of this application. As shown in FIG. 8, the method may include steps 810 to 860. The following separately describes steps 810 to 860 in detail.

Step 810: A controller (controller) delivers, to a BFIR, a statistics collection instruction based on a specific flow (VPN, S, G).

When statistics about traffic of a specific multicast flow need to be collected, the controller delivers, to the BFIR, the statistics collection instruction based on the specific flow (VPN, S, G).

Step 820: The BFIR may report, to the controller, a flow identifier corresponding to flow information (VPN, S, G).

For example, "BFIR-ID+entropy" is used as a flow identifier to uniquely identify a multicast flow. The BFIR may report a correspondence between the flow information (VPN, S, G) and "BFIR-ID+entropy" shown in Table 1 to the controller. For example, "SA+flow label" is used as a flow identifier to uniquely identify a multicast flow. The BFIR may report a correspondence between the flow information (VPN, S, G) and "SA+flow label" shown in Table 2 to the controller. For example, (VPN, S, G) is used to uniquely identify a multicast flow. The BFIR may report the information shown in Table 3 to the controller. For details, refer to the foregoing descriptions. Details are not described herein again.

Step 830: When performing BIER encapsulation on a multicast flow on which traffic statistics collection needs to be performed, the BFIR includes a multicast traffic statistics collection identifier.

For a multicast flow that is delivered by the controller and on which traffic statistics collection needs to be performed, when performing BIER encapsulation on the multicast flow, the BFIR may include a multicast traffic statistics collection identifier in an encapsulated BIER packet, so that a BFR and a BFER in a BIER domain may perform traffic statistics collection on the BIER packet based on the multicast traffic statistics collection identifier carried in the BIER packet.

In this embodiment of this application, there are a plurality of specific implementations of including the multicast traffic statistics collection identifier in the BIER packet. The following describes several possible implementations in detail.

1. In a possible implementation, a field in a BIER header may be used to carry the multicast traffic statistics collection identifier.

The field is not specifically limited in this embodiment of this application. A field in the BIER header or a value of a field in the BIER header may separately indicate the multicast traffic statistics collection identifier. Alternatively, a field shared with another function or a value of a field shared with another function may indicate the multicast traffic statistics collection identifier.

In an example, an OAM field in the BIER header may be used to carry a BIER multicast flow statistics collection identifier. Specifically, the OAM field of the BIER header may be used. A value 00 of the OAM field indicates a default value. A value is selected from remaining values 01, 10, and 11 to identify that multicast flow statistics collection needs to be performed on the packet. For example, the value 11 is selected to indicate that multicast flow statistics collection needs to be performed on the packet.

When the BFIR configures a list of multicast channels whose statistics are to be collected, a value of an OAM field in a BIER header of a multicast packet whose statistics are to be collected is set to 11. The BFR and the BFER in the BIER domain only configure an enabling instruction used to enable BIER traffic statistics collection, for example, configure bier statistic enable based on a device, and do not need to configure a channel list. This significantly reduces configuration workload and improves efficiency. When receiving the BIER multicast packet and performing BIER forwarding processing, the BFR and the BFER in the BIER domain check the OAM field. If the value of the OAM field is 11, it indicates that multicast flow statistics collection needs to be performed on the multicast packet. In this way, a traffic statistics collection result of the multicast packet may be reported to the controller.

In another example, a Rsv field in the BIER header may be used to carry the multicast traffic statistics collection identifier. A specific implementation is similar to the foregoing process in which the OAM field is used to carry the BIER multicast flow statistics collection identifier. For details, refer to the foregoing descriptions, and details are not described herein again.

2. In another possible implementation, extension information in a BIER header may be used to identity that BIER multicast traffic statistics collection needs to be performed, and an extension header is used to carry a BIER multicast traffic statistics collection flag.

Specifically, the BIER header may be extended and a new proto field (for example, 0x3F) is defined, to indicate the extension information to be carried after the BIER header. A field or a value of a field in the extension information may be used to identify that multicast flow statistics collection needs to be performed on the packet.

In an example, when the BFIR configures a list of multicast channels whose statistics are to be collected, a proto field in a BIER header of a multicast packet whose statistics are to be collected is set to 0x3F, and a BIER header is extended, to add a traffic statistics collection identifier. The BFR and the BFER in the BIER domain only configure an enabling instruction used to enable BIER traffic statistics collection, for example, configure bier statistic enable based on a device, and do not need to configure a channel list. This significantly reduces configuration workload and improves efficiency.

Specifically, when receiving the BIER multicast packet and performing BIER forwarding processing, the BFR and the BFER in the BIER domain check the proto field. If the proto field is 0x3F, the BFR and the BFER in the BIER domain continue to check the extension information in the BIER header. If the BFR and the BFER in the BIER domain identifies that the extension information is a traffic statistics collection enabling flag, the BFR and the BFER in the BIER domain perform multicast traffic statistics collection on the multicast packet, and report a traffic statistics collection result to the controller.

3. In another possible implementation, a BIER header format of a new version may alternatively be defined, and a flag indicating that traffic statistics collection is enabled for a multicast flow is added to the header format of the new version.

Specifically, a structure of the BIER header of the new version may be defined as, for example, Ver=1. A multicast traffic statistics collection field (for example, a Stat field) is added to the structure of the header of the new version. For example, when a value of the Stat field is 01, it indicates that multicast flow statistics collection needs to be performed on the multicast packet.

In an example, when the BFIR configures a list of multicast channels whose statistics are to be collected, a Stat field in a BIER header of a multicast packet whose statistics are to be collected is set to 0x01. The BFR and the BFER in the BIER domain only configure an enabling instruction used to enable BIER traffic statistics collection, for example, configure bier statistic enable based on a device, and do not need to configure a channel list. This significantly reduces configuration workload and improves efficiency.

Specifically, when receiving the BIER multicast packet and performing BIER forwarding processing, the BFR and the BFER in the BIER domain identify BIER header encapsulation whose structure is defined as Ver=1 and check the Stat field. If a value of the Stat field is 01, the BFR and the BFER in the BIER domain perform traffic statistics collection on the multicast packet, and report a traffic statistics collection result to the controller.

It should be noted that, in this implementation, it is required that all devices that perform BIER multicast forwarding in a network and perform BIER multicast traffic statistics collection support the structure of the BIER header of the new version (Ver=1).

Step 840: The BFIR sends the BIER packet to the BFR and the BFER in the BIER domain.

Step 850: The BFR and the BFER in the BIER domain process the BIER packet and report a traffic statistics collection result.

After receiving the BIER packet sent by the BFIR, the BFR and the BFER in the BIER domain determine whether the BIER packet carries the multicast traffic statistics collection identifier.

For example, the OAM field in the BIER header carries the BIER multicast flow statistics collection identifier. The BFR and the BFER in the BIER domain may check the OAM field. If the value of the OAM field is 11, it indicates that multicast flow statistics collection needs to be performed on the multicast packet. In this way, traffic statistics of the multicast packet may be reported to the controller. For another implementation, refer to the descriptions in step 830. Details are not described herein again.

The following describes in detail a specific implementation of how the BFR and the BFER in the BIER domain complete traffic statistics collection based on a traffic statistics enabling flag by using an example in which OAM field=11 in a BIER header indicates that BIER multicast traffic statistics collection is enabled.

When the BFR and the BFER in the BIER domain receive a BIER multicast flow for the first time, if BIER multicast traffic statistics collection is enabled on a device interface, a forwarding plane checks the BIER header. If the OAM field=11 is found, the forwarding plane sends traffic to a control plane and the control plane learns a flow table. After learning the flow table, the control plane notifies the forwarding plane of an ACL rule of the flow, applies for a flow statistics collection resource, and delivers the flow statistics collection resource to the forwarding plane. The forwarding plane then match a multicast flow based on the ACL rule and performs traffic statistics collection.

It should be noted that, if the forwarding plane checks the BIER header and finds that the OAM is not 11, the forwarding plane does not perform the foregoing sending and flow table learning processing, but directly performs forwarding based on a BIER entry.

For example, (VPN, S, G) is used to uniquely identify a multicast flow. The traffic statistics reported by the BFR and the BFER in the BIER domain may include: a BFR-id, (VPN, S, G), and traffic statistics information. Optionally, in some embodiments, the BFR and the BFER in the BIER domain may further periodically report information on traffic ingress and egress interfaces to the controller.

For example, "BFIR-ID+entropy" is used as a flow identifier to uniquely identify a multicast flow. The traffic statistics reported by the BFR and the BFER in the BIER domain may include: a BFR-id, entropy, and traffic statistics information. Optionally, in some embodiments, the BFR and the BFER in the BIER domain may further periodically report information on traffic ingress and egress interfaces to the controller.

For example, "SA+flow label" is used as a flow identifier to uniquely identify a multicast flow. The traffic statistics reported by the BFR and the BFER in the BIER domain may include: an SA, a flow label, and traffic statistics information. Optionally, in some embodiments, the BFR and the BFER in the BIER domain may further periodically report information on traffic ingress and egress interfaces to the controller.

Step 860: The controller performs analysis based on the traffic statistics collection result reported by the BFR and the BFER in the BIER domain.

This step is similar to step 740. For details, refer to the descriptions in step 740. Details are not described herein again.

According to the foregoing technical solution, the traffic statistics flag of the BIER multicast flow may be carried in the multicast flow. In this way, the BFIR only needs to deliver traffic statistics collection instructions for different multicast flows, and does not need to deliver traffic statistics collection instructions based on the multicast flow to a large quantity of BFRs and BFERs. This simplifies deployment.

The foregoing describes in detail the BIER multicast traffic statistics collection method provided in embodiments of this application with reference to FIG. 1 to FIG. 8. The following describes in detail apparatus embodiments of this application with reference to FIG. 9 to FIG. 13. It should be understood that, descriptions of the method embodiments correspond to descriptions of the apparatus embodiments. Therefore, for a part not described in detail, refer to the foregoing method embodiments.

Figure 9:
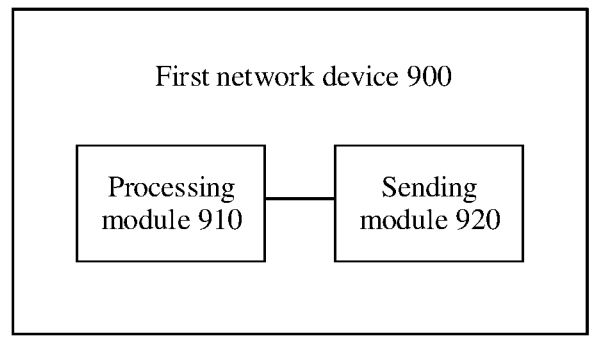
FIG. 9 is a schematic diagram of a structure of a first network device 900 according to an embodiment of this application.

FIG. 9 is a schematic diagram of a structure of a first network device 900 according to an embodiment of this application. The first network device 900 shown in FIG. 9 may perform corresponding steps performed by the first network device in the method in the foregoing embodiments. As shown in FIG. 9, the first network device 900 includes a processing module 910 and a sending module 920.

The processing module 910 is configured to obtain a first BIER packet.

The processing module 910 is further configured to perform traffic statistics collection on the first BIER packet based on multicast flow information, to obtain a traffic statistics collection result of the first BIER packet. The multicast flow information is used to identify a multicast flow to which the first BIER packet belongs.

The sending module 920 is configured to send the multicast flow information and the traffic statistics collection result of the first BIER packet to a controller.

Optionally, the first network device 900 is an ingress device in a BIER domain.

The processing module 910 is further configured to perform BIER encapsulation on first multicast data based on a traffic statistics collection instruction, to obtain the first BIER packet, where the traffic statistics collection instruction includes a multicast source group (S, G) of the first multicast data, and the traffic statistics collection instruction is used to instruct to perform traffic statistics collection on the first multicast data that includes the multicast source group (S, G).

Optionally, the processing module 910 is further configured to generate a first correspondence, where the first correspondence is a correspondence between the multicast source group (S, G) of the first multicast data and the multicast flow information.

The sending module 920 is further configured to send the first correspondence to the controller.

Optionally, the first network device 900 is an intermediate forwarding device or an egress device in a BIER domain. The processing module 910 is further configured to determine to perform traffic statistics collection on the first BIER packet.

Optionally, the first network device 900 further includes:

a receiving module 930, configured to receive first indication information sent by the controller, where the first indication information includes the multicast flow information, and the first indication information indicates to perform traffic statistics collection on the first BIER packet.

The processing module 910 is specifically configured to determine to perform traffic statistics collection on the first BIER packet based on the first indication information.

Optionally, the multicast flow information includes any one of the following:

a bit forwarding ingress router identifier BFIR-ID and an entropy label in a BIER header of the first BIER packet;

a source address SA and a flow label in an outer internet protocol version 6 IPv6 header of the first BIER packet;

the multicast source group (S, G) of the first multicast data in an inner layer of the first BIER packet; or a virtual private network multicast source group (VPN, S, G) of the first multicast data in an inner layer of the first BIER packet.

Optionally, the first BIER packet carries a traffic statistics collection identifier, and the traffic statistics collection identifier indicates to perform traffic statistics collection on the first BIER packet. The processing module 910 is specifically configured to determine to perform traffic statistics collection on the first BIER packet based on the traffic statistics collection identifier.

Optionally, the traffic statistics collection identifier is carried in a first field of the first BIER packet.

Optionally, the first field is an operations, administration, and maintenance OAM field, a reserved Rsv field, or a field in a BIER extension header.

Optionally, the first BIER packet further includes a second field, and the second field indicates that the first field carries the traffic statistics collection identifier. The processing module 910 is further configured to obtain the traffic statistics collection identifier in the first field based on the second field.

Optionally, the processing module 910 is further configured to obtain interface information of the first BIER packet. The sending module 920 is specifically configured to send the interface information of the first BIER packet to the controller.

Figure 10:
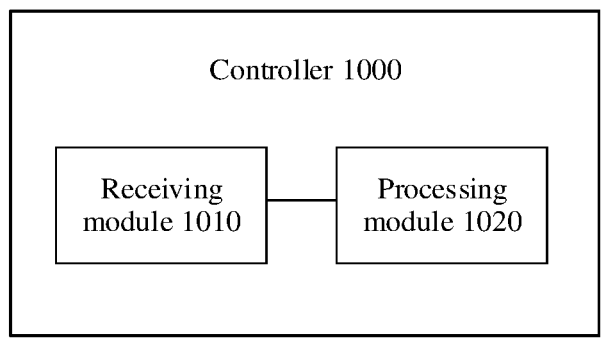
FIG. 10 is a schematic diagram of a structure of a controller 1000 according to an embodiment of this application.

FIG. 10 is a schematic diagram of a structure of a controller 1000 according to an embodiment of this application. The controller 1000 shown in FIG. 10 may perform corresponding steps performed by the controller in the method in the foregoing embodiments. As shown in FIG. 10, the controller 1000 includes a receiving module 1010 and a processing module 1020.

The receiving module 1010 is configured to receive multicast flow information and a traffic statistics collection result of a first BIER packet that are sent by a first network device in a BIER domain. The multicast flow information is used to identify a multicast flow to which the first BIER packet belongs.

The processing module 1020 is configured to perform traffic analysis on the first BIER packet based on the multicast flow information and the traffic statistics collection result of the first BIER packet.

Optionally, the first network device is an ingress device in the BIER domain. The controller 1000 further includes a sending module 1030, configured to send a traffic statistics collection instruction to the first network device, where the traffic statistics collection instruction includes a multicast source group (S, G) of first multicast data, and the traffic statistics collection instruction is used to instruct the first network device to perform traffic statistics collection on the first BIER packet that includes the multicast source group (S, G).

Optionally, the receiving module 1010 is further configured to receive a first correspondence sent by the first network device, where the first correspondence is a correspondence between the multicast source group (S, G) of the first multicast data and the multicast flow information.

Optionally, the multicast flow information includes any one of the following:

a bit forwarding ingress router identifier BFIR-ID and an entropy label in a BIER header of the first BIER packet;

a source address SA and a flow label in an outer internet protocol version 6 IPv6 header of the first BIER packet;

the multicast source group (S, G) of the first multicast data in an inner layer of the first BIER packet; or a virtual private network multicast source group (VPN, S, G) of the first multicast data in an inner layer of the first BIER packet.

Optionally, the first network device is an intermediate forwarding device or an egress device in a BIER domain. The sending module 1030 is further configured to send first indication information to the first network device, the first indication information includes the multicast flow information, and the first indication information indicates the first network device to perform traffic statistics collection on the first BIER packet.

Optionally, the receiving module 1010 is further configured to receive interface information of the first BIER packet sent by the first network device.

The processing module 1020 is further configured to determine a transmission path of the first BIER packet based on the interface information of the first BIER packet and physical topology information.

Figure 11:
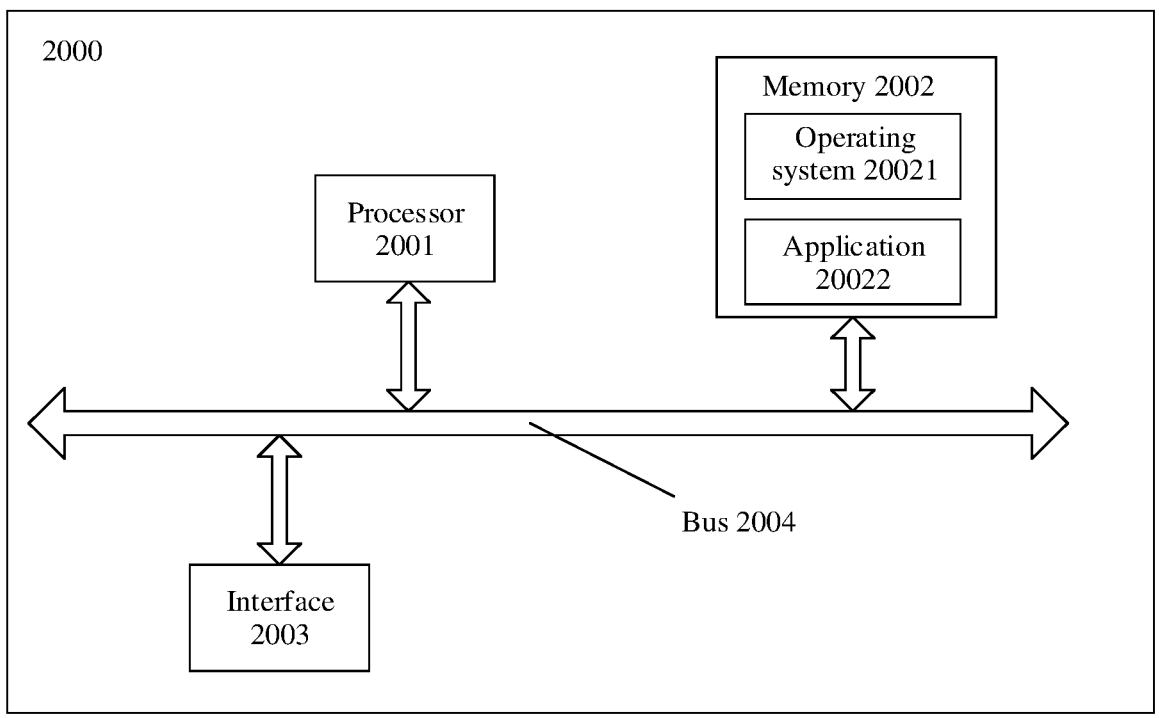
FIG. 11 is a schematic diagram of a hardware structure of a first network device 2000 according to an embodiment of this application.

FIG. 11 is a schematic diagram of a hardware structure of a first network device 2000 according to an embodiment of this application. The first network device 2000 shown in FIG. 11 may perform corresponding steps performed by the first network device in the method in the foregoing embodiments.

As shown in FIG. 11, the first network device 2000 includes a processor 2001, a memory 2002, an interface 2003, and a bus 2004. The interface 2003 may be implemented in a wireless or wired manner, and may be specifically a network adapter. The processor 2001, the memory 2002, and the interface 2003 are connected through the bus 2004.

The interface 2003 may specifically include a transmitter and a receiver, and is configured to enable the first network device to implement the foregoing receiving and sending. For example, the interface 2003 is configured to receive the first BIER packet, or configured to send the multicast flow information and the traffic statistics collection result of the first BIER packet to a controller.

The processor 2001 is configured to perform processing performed by the first network device in the foregoing embodiments. For example, the processor 2001 is configured to perform traffic statistics collection on the first BIER packet based on the multicast flow information, to obtain a traffic statistics collection result of the first BIER packet; and/or the processor 2001 is configured to perform another process of the technology described in this specification. The memory 2002 includes an operating system 20021 and an application program 20022, and is configured to store a program, code, or instructions. When a processor or a hardware device executes the program, the code, or the instructions, a processing process related to the first network device in the method embodiments may be completed. Optionally, the memory 2002 may include a read-only memory (ROM) and a random access memory (RAM). The ROM includes a basic input/output system (BIOS) or an embedded system, and the RAM includes an application program and an operating system. When the first network device 2000 needs to be run, a bootloader in a BIOS built into the ROM or in an embedded system is used to boot a system to start, and boot the first network device 2000 to enter a normal running state. After entering the normal running state, the first network device 2000 runs the application and the operating system in the RAM, so as to complete the processing process of the first network device 2000 in the method embodiments.

It may be understood that FIG. 11 shows only a simplified design of the first network device 2000. The first network device may include any quantity of interfaces, processors, or memories in an actual application.

Figure 12:
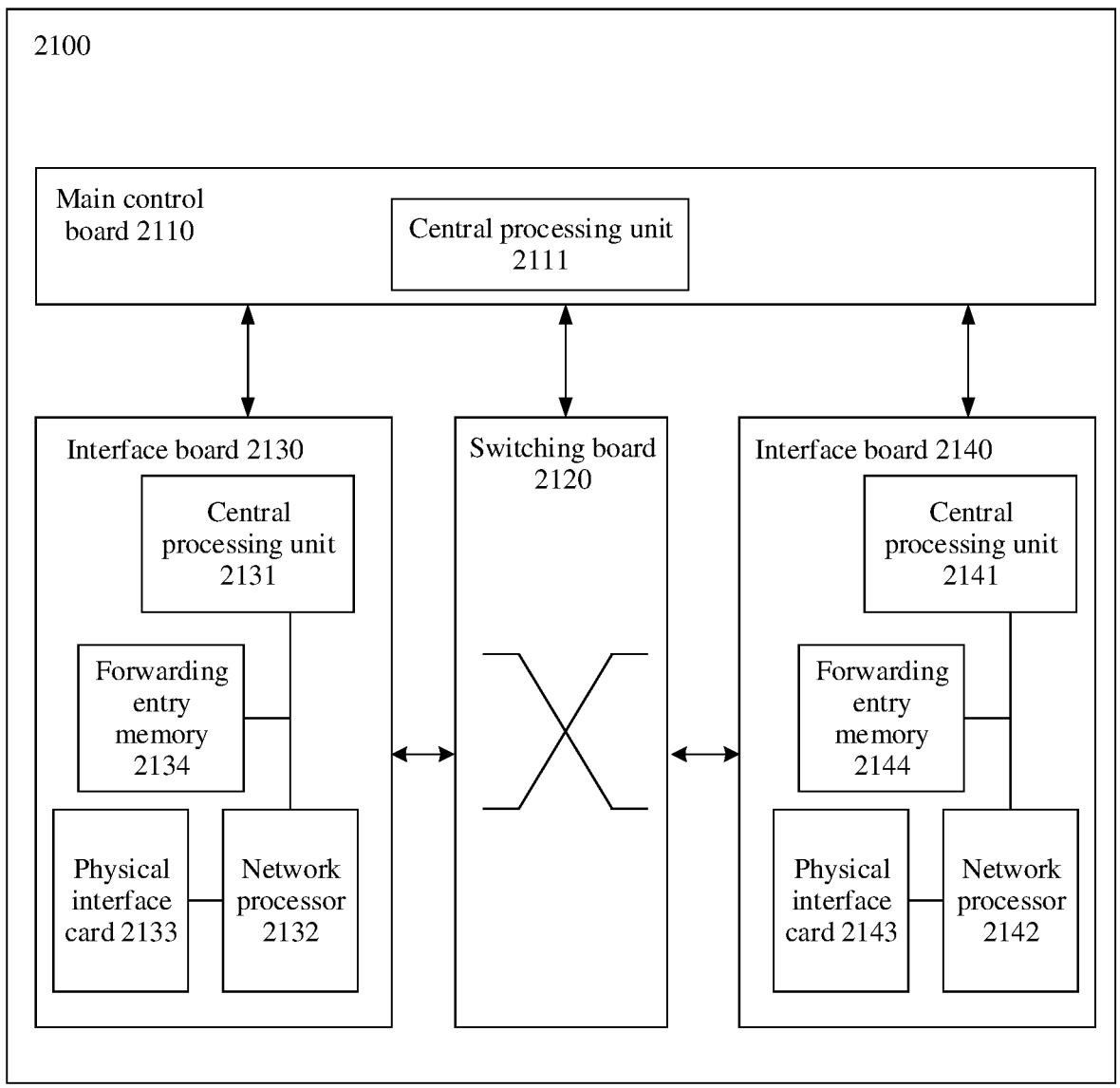
FIG. 12 is a schematic diagram of a hardware structure of another first network device 2100 according to an embodiment of this application.

FIG. 12 is a schematic diagram of a hardware structure of another first network device 2100 according to an embodiment of this application. The first network device 2100 shown in FIG. 12 may perform corresponding steps performed by the first network device in the method in the foregoing embodiments.

As shown in FIG. 12, the first network device 2100 includes a main control board 2110, an interface board 2130, a switching board 2120, and an interface board 2140. The main control board 2110, the interface board 2130, the interface board 2140, and the switching board 2120 are connected to a system backplane through a system bus for interworking. The main control board 2110 is configured to complete functions such as system management, device maintenance, and protocol processing. The switching board 2120 is configured to complete data exchange between interface boards (where the interface board is also referred to as a line card or a service board). The interface boards 2130 and 2140 are configured to provide various service interfaces (for example, a POS interface, a GE interface, and an ATM interface), and forward a data packet.

The interface board 2130 may include a central processing unit 2131, a forwarding entry memory 2134, a physical interface card 2133, and a network processor 2132. The central processing unit 2131 is configured to: control and manage the interface board, and communicate with a central processing unit on the main control board. The forwarding entry memory 2134 is configured to store an entry, for example, the foregoing BIFT. The physical interface card 2133 is configured to receive and send traffic.

It should be understood that an operation on the interface board 2140 is consistent with an operation on the interface board 2130 in this embodiment of this application. For brevity, details are not described herein again.

It should be understood that the first network device 2100 in this embodiment may correspond to the functions and/or the various implemented steps in the method embodiments. Details are not described herein again.

In addition, it should be noted that there may be one or more main control boards. When there are a plurality of main control boards, the main control boards may include an active main control board and a standby main control board. There may be one or more interface boards. A first network device having a stronger data processing capability provides more interface boards. There may also be one or more physical interface cards on the interface board. There may be no switching board or one or more switching boards. When there are a plurality of switching boards, load balancing and redundancy backup may be implemented together. In a centralized forwarding architecture, the first network device may not need a switching board, and the interface board undertakes a service data processing function of an entire system. In a distributed forwarding architecture, the first network device may have at least one switching board. Data between a plurality of interface boards is exchanged through the switching board, to provide a large-capacity data exchange and processing capability. Therefore, a data access and processing capability of the first network device in the distributed architecture is greater than that of the device in the centralized architecture. A specific architecture that is to be used depends on a specific networking deployment scenario. This is not limited herein.

Figure 13:
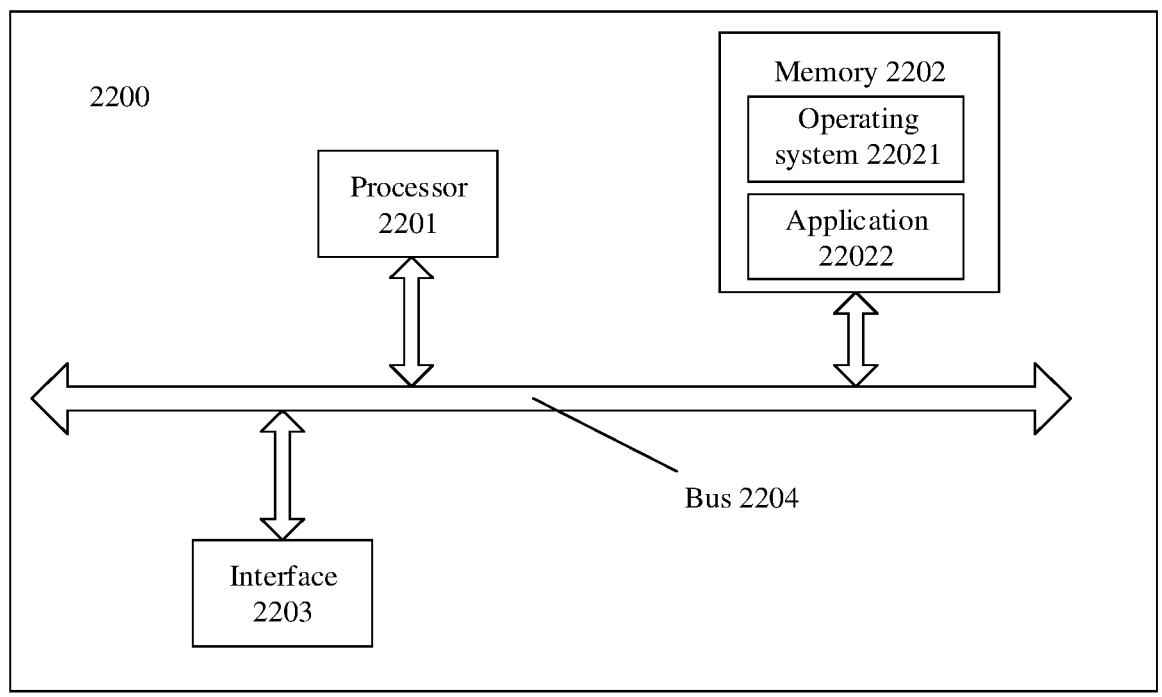
FIG. 13 is a schematic diagram of a hardware structure of a controller 2200 according to an embodiment of this application.

FIG. 13 is a schematic diagram of a hardware structure of a controller 2200 according to an embodiment of this application. The controller 2200 shown in FIG. 13 may perform corresponding steps performed by the controller in the method in the foregoing embodiments.

As shown in FIG. 13, the controller 2200 includes a processor 2201, a memory 2202, an interface 2203, and a bus 2204. The interface 2203 may be implemented in a wireless or wired manner, and may be specifically a network adapter. The processor 2201, the memory 2202, and the interface 2203 are connected through the bus 2204.

The interface 2203 may specifically include a transmitter and a receiver, and is configured to enable the controller to implement the foregoing receiving and sending. For example, the interface is configured to support receiving multicast flow information and a traffic statistics collection result of a first BIER packet that are sent by a first network device in a BIER domain. For another example, the interface 2203 is configured to support delivering a traffic statistics collection instruction to the first network device. For another example, the interface 2203 is configured to support receiving a first correspondence sent by the first network device.

The processor 2201 is configured to perform processing performed by the controller in the foregoing embodiments. For example, the processor 2201 is configured to perform traffic statistics collection on the first BIER packet based on the multicast flow information and the traffic statistics collection result of the first BIER packet; and/or the processor 2201 is configured to perform another process of the technology described in this specification. The memory 2202 includes an operating system 22021 and an application program 22022, and is configured to store a program, code, or instructions. When a processor or a hardware device executes the program, the code, or the instructions, a processing process related to the controller in the method embodiments may be completed. Optionally, the memory 2202 may include a read-only memory (ROM) and a random access memory (RAM). The ROM includes a basic input/output system (BIOS) or an embedded system, and the RAM includes an application program and an operating system. When the controller 2200 needs to be run, a bootloader in a BIOS built into the ROM or in an embedded system is used to boot a system to start, and boot the controller 2200 to enter a normal running state. After entering the normal running state, the controller 2200 runs the application program and operating system in the RAM, so as to complete the processing process related to the controller 2200 in the method embodiments.

It may be understood that FIG. 13 shows merely a simplified design of the controller 2200. The second network device may include any quantity of interfaces, processors, or memories in an actual application.

An embodiment of this application further provides a computer-readable medium. The computer-readable medium stores program code. When the computer program code is run on a computer, the computer is enabled to perform the method performed by the first network device.

The computer-readable storage includes but is not limited to one or more of the following: a read-only memory (ROM), a programmable ROM (PROM), an erasable PROM (EPROM), a Flash memory, electrically EPROM (EEPROM), and hard drive.

An embodiment of this application further provides a computer-readable medium. The computer-readable medium stores program code. When the computer program code is run on a computer, the computer is enabled to perform the method performed by the controller. The computer-readable storage includes but is not limited to one or more of the following: a read-only memory (read-only memory, ROM), a programmable ROM (PROM), an erasable PROM (EPROM), a Flash memory, electrically EPROM (EEPROM), and hard drive.

An embodiment of this application further provides a chip system used in a first network device. The chip system includes at least one processor, at least one memory, and an interface circuit. The interface circuit is responsible for information exchange between the chip system and the outside. The at least one memory, the interface circuit, and the at least one processor are interconnected through a line. The at least one memory stores instructions, and the instructions are executed by the at least one processor, to perform operations of the first network device in the methods in the foregoing aspects.

In a specific implementation process, the chip may be implemented in a form of a central processing unit (CPU), a micro controller unit (MCU), a micro processing unit (MPU), a digital signal processor (DSP), a system-on-a-chip (SoC), an application-specific integrated circuit (ASIC), a field programmable gate array (FPGA), or a programmable logic device (PLD).

An embodiment of this application further provides another chip system, which is used in a controller. The chip system includes at least one processor, at least one memory, and an interface circuit. The interface circuit is responsible for information exchange between the chip system and the outside. The at least one memory, the interface circuit, and the at least one processor are interconnected through a line. The at least one memory stores instructions. The instructions are executed by the at least one processor, to perform operations of the controller in the method in the foregoing aspects.

In a specific implementation process, the chip may be implemented in a form of a central processing unit (CPU), a micro controller unit (MCU), a micro processing unit (MPU), a digital signal processor (DSP), a system-on-a-chip (SoC), an application-specific integrated circuit (ASIC), a field programmable gate array (FPGA), or a programmable logic device (PLD).

An embodiment of this application further provides a computer program product used in a first network device. The computer program product includes a series of instructions, and when the instructions are executed, operations of the first network device in the methods in the foregoing aspects are performed.

An embodiment of this application further provides a computer program product used in a controller. The computer program product includes a series of instructions, and when the instructions are executed, operations of the controller in the method in the foregoing aspects are performed.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions to enable a computer device (which may be a personal computer, a server, a network device, or the like) to perform all or some of the steps of the method described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
performing, by a first network device, bit index explicit replication (BIER) encapsulation on first multicast data based on a traffic statistics collection instruction, to obtain a first BIER packet, wherein the traffic statistics collection instruction indicates a multicast source group of the first multicast data, and the traffic statistics collection instruction instructs to perform traffic statistics collection on the first multicast data that belongs to the multicast source group, and wherein the first network device is an ingress device in a BIER domain;
performing, by the first network device, traffic statistics collection on the first BIER packet based on multicast flow information, to obtain a traffic statistics collection result of the first BIER packet, wherein the multicast flow information identifies a multicast flow to which the first BIER packet belongs; and
sending, by the first network device, the multicast flow information and the traffic statistics collection result of the first BIER packet to a controller.

2. The method according to claim 1, further comprising:
generating, by the first network device, a first correspondence, wherein the first correspondence is between the multicast source group of the first multicast data and the multicast flow information; and
sending, by the first network device, the first correspondence to the controller.

3. The method according to claim 2, wherein the multicast flow information comprises a bit forwarding ingress router identifier (BFIR-ID) and an entropy label in a BIER header of the first BIER packet.

4. The method according to claim 2, wherein the multicast flow information comprises a source address (SA) and a flow label in an outer internet protocol version 6 (IPv6) header of the first BIER packet.

5. The method according to claim 2, wherein the multicast flow information comprises an identifier of the multicast source group of the first multicast data in an inner layer of the first BIER packet.

6. The method according to claim 2, wherein the multicast flow information comprises
an identifier of virtual private network multicast source group of the first multicast data in an inner layer of the first BIER packet.

7. The method according to claim 1, further comprising:
obtaining, by the first network device, interface information of the first BIER packet; and
sending, by the first network device, the interface information of the first BIER packet to the controller.

8. The method according to claim 1, wherein the traffic statistics collection instruction includes the first multicast data.

9. A method, comprising:
sending, by a controller, a traffic statistics collection instruction to a first network device in a bit index explicit replication (BIER) domain, wherein the traffic statistics collection instruction identifies a multicast source group of first multicast data, and the traffic statistics collection instruction instructs the first network device to perform traffic statistics collection on a first BIER packet that belongs to the multicast source group, and wherein the first network device is an ingress device in the BIER domain;
receiving, by the controller, multicast flow information and a traffic statistics collection result of the first BIER packet that are sent by the first network device, wherein the multicast flow information identifies a multicast flow to which the first BIER packet belongs; and
performing, by the controller, traffic analysis on the first BIER packet based on the multicast flow information and the traffic statistics collection result of the first BIER packet.

10. The method according to claim 9, wherein before receiving, by the controller, the multicast flow information and the traffic statistics collection result of the first BIER packet that are sent by the first network device, the method further comprises:
receiving, by the controller, a first correspondence sent by the first network device, wherein the first correspondence is between the multicast source group of the first multicast data and the multicast flow information.

11. The method according to claim 9, wherein the multicast flow information comprises a bit forwarding ingress router identifier (BFIR-ID) and an entropy label in a BIER header of the first BIER packet.

12. The method according to claim 9, further comprising:
receiving, by the controller, interface information of the first BIER packet sent by the first network device; and
determining, by the controller, a transmission path of the first BIER packet based on the interface information of the first BIER packet and physical topology information.

13. The method according to claim 9, wherein the multicast flow information comprises a source address (SA) and a flow label in an outer internet protocol version 6 (IPv6) header of the first BIER packet.

14. The method according to claim 9, wherein the multicast flow information comprises an identifier of the multicast source group of the first multicast data in an inner layer of the first BIER packet.

15. The method according to claim 9, wherein the multicast flow information comprises an identifier of a virtual private network multicast source group of the first multicast data in an inner layer of the first BIER packet.

16. The method according to claim 9, wherein sending, by the controller, the traffic statistics collection instruction to the first network device in the BIER domain comprises:
sending, by the controller, the traffic statistics collection instruction to all devices in a network.

17. A first network device, comprising:
a non-transitory memory storing instructions; and
a processor coupled to the non-transitory memory; wherein the instructions, when executed by the processor, cause the first network device to be configured to:
perform bit index explicit replication (BIER) encapsulation on first multicast data based on a traffic statistics collection instruction, to obtain a first BIER packet, wherein the traffic statistics collection instruction indicates a multicast source group of the first multicast data, and the traffic statistics collection instruction instructs to perform traffic statistics collection on the first multicast data that belongs to the multicast source group, and wherein the first network device is an ingress device in a BIER domain;
perform traffic statistics collection on the first BIER packet based on multicast flow information, to obtain a traffic statistics collection result of the first BIER packet, wherein the multicast flow information identifies a multicast flow to which the first BIER packet belongs; and send the multicast flow information and the traffic statistics collection result of the first BIER packet to a controller.

18. The first network device according to claim 17, wherein the instructions, when executed by the processor, further cause the first network device to be configured to:
generate a first correspondence, wherein the first correspondence is between the multicast source group of the first multicast data and the multicast flow information; and
send the first correspondence to the controller.

19. The first network device according to claim 18, wherein the multicast flow information comprises a bit forwarding ingress router identifier (BFIR-ID) and an entropy label in a BIER header of the first BIER packet.

20. The first network device according to claim 9, wherein the multicast flow information comprises a source address (SA) and a flow label in an outer internet protocol version 6 (IPv6) header of the first BIER packet.

21. The first network device according to claim 18, wherein the multicast flow information comprises
an identifier of the multicast source group of the first multicast data in an inner layer of the first BIER packet.

22. The first network device according to claim 18, wherein the multicast flow information comprises an identifier of a virtual private network multicast source group of the first multicast data in an inner layer of the first BIER packet.

23. The first network device according to claim 18, wherein the traffic statistics collection instruction includes the first multicast data.

24. A controller, comprising:
a non-transitory memory storing instructions; and
a processor coupled to the non-transitory memory; wherein the instructions, when executed by the processor, cause the controller to be configured to:
send a traffic statistics collection instruction to a first network device in a bit index explicit replication (BIER) domain, wherein the traffic statistics collection instruction identifies a multicast source group of first multicast data, and the traffic statistics collection instruction instructs the first network device to perform traffic statistics collection on a first BIER packet that belongs to the multicast source group, and wherein the first network device is an ingress device in the BIER domain;
receive multicast flow information and a traffic statistics collection result of the first BIER packet that are sent by the first network device, wherein the multicast flow information identifies a multicast flow to which the first BIER packet belongs; and
perform traffic analysis on the first BIER packet based on the multicast flow information and the traffic statistics collection result of the first BIER packet.

25. The controller according to claim 24, wherein the instructions, when executed by the processor, further cause the first network device to be configured to:
receive a first correspondence sent by the first network device, wherein the first correspondence is between the multicast source group of the first multicast data and the multicast flow information.

26. The controller according to claim 24, wherein the multicast flow information comprises a bit forwarding ingress router identifier (BFIR-ID) and an entropy label in a BIER header of the first BIER packet.

27. The controller according to claim 24, wherein the multicast flow information comprises a source address (SA) and a flow label in an outer internet protocol version 6 (IPv6) header of the first BIER packet.

28. The controller according to claim 24, wherein the multicast flow information comprises an identifier of the multicast source group of the first multicast data in an inner layer of the first BIER packet.

29. The controller according to claim 24, wherein the multicast flow information comprises an identity of a virtual private network multicast source group of the first multicast data in an inner layer of the first BIER packet.

30. The controller according to claim 24, wherein sending the traffic statistics collection instruction to the first network device in the BIER domain comprises:
sending the traffic statistics collection instruction to all devices in a network.

* * * * *

UNITED STATES PATENT AND TRADEMARK OFFICE
CERTIFICATE OF CORRECTION

PATENT NO. : 11,870,681 B2
APPLICATION NO. : 18/061161
DATED : January 9, 2024
INVENTOR(S) : Liu et al.

It is certified that error appears in the above-identified patent and that said Letters Patent is hereby corrected as shown below:

In the Claims

In Column 39, in Claim 20, Line 16, delete "claim 9," and insert -- claim 18, --.

Signed and Sealed this
Twenty-sixth Day of March, 2024

Katherine Kelly Vidal
*Director of the United States Patent and Trademark Office*